(12) United States Patent
Liu et al.

(10) Patent No.: US 12,281,466 B2
(45) Date of Patent: Apr. 22, 2025

(54) INDOOR GREY WATER PURIFICATION AND REUSE DEVICE, SYSTEM AND METHOD FOR PUBLIC BUILDINGS

(71) Applicant: China Architecture Design & Research Group Co., Ltd., Beijing (CN)

(72) Inventors: Yongwang Liu, Beijing (CN); Li Zhao, Beijing (CN); Xingchao Lu, Beijing (CN); Wenchao Yin, Beijing (CN); Xin Zhao, Beijing (CN); Jianye Li, Beijing (CN); Fangzhai Zhang, Beijing (CN)

(73) Assignee: China Architecture Design & Research Group Co., Ltd., Beijing (CN)

( * ) Notice: Subject to any disclaimer, the term of this patent is extended or adjusted under 35 U.S.C. 154(b) by 513 days.

(21) Appl. No.: 17/800,117

(22) PCT Filed: Sep. 15, 2020

(86) PCT No.: PCT/CN2020/115333
§ 371 (c)(1),
(2) Date: Aug. 16, 2022

(87) PCT Pub. No.: WO2022/032787
PCT Pub. Date: Feb. 17, 2022

(65) Prior Publication Data
US 2023/0075157 A1 Mar. 9, 2023

(30) Foreign Application Priority Data

Aug. 13, 2020 (CN) .................. 202010813150.X
Aug. 13, 2020 (CN) .................. 202010813348.8
(Continued)

(51) Int. Cl.
*E03C 1/122* (2006.01)
*C02F 1/32* (2023.01)
(Continued)

(52) U.S. Cl.
CPC ............. *E03C 1/122* (2013.01); *C02F 1/32* (2013.01); *C02F 9/00* (2013.01); *E03B 1/04* (2013.01); *G08B 7/06* (2013.01); *E03B 2001/045* (2013.01)

(58) Field of Classification Search
None
See application file for complete search history.

(56) References Cited

U.S. PATENT DOCUMENTS 37,896 A * 3/1863 Bissicks ............... E03D 11/025
4/665
167,972 A * 9/1875 Ball ...................... E03B 1/04
4/665
(Continued)

FOREIGN PATENT DOCUMENTS

CN 10160786 A 10/2009
CN 103469858 A 12/2013
(Continued)

*Primary Examiner* — Robert J Popovics
(74) *Attorney, Agent, or Firm* — Sand, Sebolt & Wernow Co., LPA

(57) ABSTRACT

An indoor grey water purification and reuse device, system and method for public buildings is disclosed. The grey water purification and reuse device includes a grey water storage tank, a grey water treatment assembly and a pneumatic reclaimed water tank assembly which are sequentially arranged from top to bottom. The grey water storage tank is used for storing grey water from one floor above collected by a grey water collecting device. The grey water treatment assembly is used for carrying out multistage purification treatment on the grey water in the grey water storage tank. The pneumatic reclaimed water tank assembly is used for (Continued)

disinfecting reclaimed water subjected to multistage purification treatment and supplying water to reclaimed water reuse facilities on the current floor of the building in a constant-pressure mode.

11 Claims, 4 Drawing Sheets

(30) Foreign Application Priority Data

| Aug. 13, 2020 | (CN) | ......................... 202010813505.5 |
| Aug. 13, 2020 | (CN) | ......................... 202021684240.5 |
| Aug. 13, 2020 | (CN) | ......................... 202021685608.X |

(51) Int. Cl.
    *C02F 9/00*     (2023.01)
    *E03B 1/04*     (2006.01)
    *G08B 7/06*     (2006.01)

(56) References Cited

U.S. PATENT DOCUMENTS

| 768,878 | A | * | 8/1904 | Legg | ................. E03B 1/04 |
| | | | | | 4/665 |
| 1,660,709 | A | * | 2/1928 | Hodgson | ................. E03C 1/01 |
| | | | | | 4/628 |
| 1,935,779 | A | * | 11/1933 | Kemach | ................. E03D 1/003 |
| | | | | | 4/479 |
| 2,058,967 | A | * | 10/1936 | Emmons | ................. E03C 1/01 |
| | | | | | 4/665 |
| 2,595,009 | A | * | 4/1952 | Sillen | ................. E03C 1/01 |
| | | | | | 4/665 |
| 3,112,497 | A | * | 12/1963 | Call | ................. E03F 5/18 |
| | | | | | 4/415 |
| 3,183,525 | A | * | 5/1965 | O'Brien | ................. E03D 5/016 |
| | | | | | 4/DIG. 9 |
| 3,318,449 | A | * | 5/1967 | Jennings | ................. E03B 1/04 |
| | | | | | 210/127 |
| 3,428,964 | A | * | 2/1969 | Lucas | ................. E03D 1/01 |
| | | | | | 4/665 |
| 3,505,690 | A | * | 4/1970 | Lockwood | ................. E03D 5/016 |
| | | | | | 4/321 |
| 3,543,294 | A | * | 11/1970 | Boester | ................. E03B 3/40 |
| | | | | | 4/320 |
| 3,588,922 | A | * | 6/1971 | Carfora | ................. E03D 1/003 |
| | | | | | 4/665 |
| 3,594,825 | A | * | 7/1971 | Reid | ................. B61D 35/00 |
| | | | | | 4/663 |
| 3,696,448 | A | * | 10/1972 | Carfora | ................. E03D 1/003 |
| | | | | | 4/651 |
| 3,711,381 | A | * | 1/1973 | Lagstrom | ................. C02F 1/24 |
| | | | | | 203/40 |
| 3,797,667 | A | * | 3/1974 | Rod | ................. B01D 21/0012 |
| | | | | | 210/313 |
| 3,856,672 | A | * | 12/1974 | Boswinkle | ................. C02F 11/08 |
| | | | | | 210/652 |
| 3,915,857 | A | * | 10/1975 | Olson | ................. C02F 1/283 |
| | | | | | 210/275 |
| 3,927,425 | A | * | 12/1975 | Delaney | ................. E03D 5/016 |
| | | | | | 4/300 |
| 3,995,327 | A | * | 12/1976 | Hendrick | ................. E03D 1/00 |
| | | | | | 4/408 |
| 3,995,328 | A | * | 12/1976 | Carolan | ................. B64D 11/02 |
| | | | | | 210/167.01 |
| 4,012,322 | A | * | 3/1977 | Saigh | ................. B63J 4/006 |
| | | | | | 210/138 |
| 4,017,395 | A | * | 4/1977 | Davis | ................. B01D 37/00 |
| | | | | | 210/197 |
| 4,030,144 | A | * | 6/1977 | Aleman | ................. A47K 17/00 |
| | | | | | 4/353 |
| 4,063,315 | A | * | 12/1977 | Carolan | ................. E03D 5/016 |
| | | | | | 4/316 |
| 4,069,521 | A | * | 1/1978 | Aleman | ................. E03D 5/006 |
| | | | | | 4/300 |
| 4,104,164 | A | * | 8/1978 | Chelton | ................. B01D 37/00 |
| | | | | | 210/136 |
| 4,115,879 | A | * | 9/1978 | Toms | ................. E03B 1/04 |
| | | | | | 210/138 |
| 4,134,833 | A | * | 1/1979 | McCormick | ................. B01D 21/10 |
| | | | | | 210/121 |
| 4,145,279 | A | * | 3/1979 | Selby, III | ................. C02F 3/08 |
| | | | | | 210/257.2 |
| 4,162,218 | A | * | 7/1979 | McCormick | ................. C02F 1/006 |
| | | | | | 210/167.01 |
| 4,172,034 | A | * | 10/1979 | Carlsson | ................. C02F 3/1242 |
| | | | | | 210/197 |
| 4,197,597 | A | * | 4/1980 | Toms | ................. E03B 1/04 |
| | | | | | 4/300 |
| 4,210,528 | A | * | 7/1980 | Coviello | ................. C02F 3/1242 |
| | | | | | 210/220 |
| 4,228,006 | A | * | 10/1980 | Hanna | ................. E03B 1/04 |
| | | | | | 210/167.3 |
| 4,358,864 | A | * | 11/1982 | Medrano | ................. E03D 1/003 |
| | | | | | 4/363 |
| 4,359,789 | A | * | 11/1982 | Roberts | ................. E03B 1/041 |
| | | | | | 4/300 |
| 4,377,875 | A | * | 3/1983 | Brubakken | ................. A47K 4/00 |
| | | | | | 4/321 |
| 4,521,925 | A | * | 6/1985 | Chen | ................. E03F 1/006 |
| | | | | | 4/321 |
| 4,626,346 | A | * | 12/1986 | Hall | ................. B01D 61/08 |
| | | | | | 210/257.2 |
| 4,653,128 | A | * | 3/1987 | Canalizo | ................. A47K 4/00 |
| | | | | | 4/663 |
| 4,812,237 | A | * | 3/1989 | Cawley | ................. C02F 3/02 |
| | | | | | 210/612 |
| 4,828,709 | A | * | 5/1989 | Houser | ................. A47K 3/28 |
| | | | | | 4/597 |
| 4,871,452 | A | * | 10/1989 | Kohler | ................. B64D 11/02 |
| | | | | | 210/167.3 |
| 4,904,387 | A | * | 2/1990 | Jordan | ................. C02F 3/302 |
| | | | | | 210/903 |
| 4,924,536 | A | * | 5/1990 | Houghton | ................. E03B 1/048 |
| | | | | | 4/668 |
| 5,039,407 | A | * | 8/1991 | Mohrman | ................. B01D 21/26 |
| | | | | | 210/259 |
| 5,059,330 | A | * | 10/1991 | Burkhardt | ................. E03B 1/04 |
| | | | | | 4/300 |
| 5,084,920 | A | * | 2/1992 | Kimball | ................. E03D 5/003 |
| | | | | | 4/DIG. 3 |
| 5,099,874 | A | * | 3/1992 | Della Cave | ................. E03C 1/122 |
| | | | | | 137/357 |
| 5,100,540 | A | * | 3/1992 | Ramirez | ................. B01D 29/605 |
| | | | | | 210/295 |
| 5,106,493 | A | * | 4/1992 | McIntosh | ................. C02F 9/00 |
| | | | | | 210/100 |
| 5,114,586 | A | * | 5/1992 | Humphrey | ................. C02F 3/1242 |
| | | | | | 210/138 |
| 5,147,532 | A | * | 9/1992 | Leek, Jr. | ................. E03B 1/04 |
| | | | | | 210/182 |
| 5,160,606 | A | * | 11/1992 | De Simone | ................. E03B 1/04 |
| | | | | | 210/232 |
| 5,173,180 | A | * | 12/1992 | Stewart | ................. E03B 1/041 |
| | | | | | 210/167.01 |
| 5,192,426 | A | * | 3/1993 | DeCoster | ................. E03B 1/04 |
| | | | | | 210/170.07 |
| 5,201,082 | A | * | 4/1993 | Rockwell | ................. E03D 5/006 |
| | | | | | 4/406 |
| 5,217,042 | A | * | 6/1993 | Delle Cave | ................. E03C 1/122 |
| | | | | | 137/357 |
| 5,217,323 | A | * | 6/1993 | Bilson | ................. E03B 1/04 |
| | | | | | 405/36 |
| 5,239,794 | A | * | 8/1993 | Klein | ................. E03B 11/00 |
| | | | | | 210/170.03 |
| 5,243,719 | A | * | 9/1993 | McDonald | ................. E03B 1/04 |
| | | | | | 4/415 |
| 5,251,346 | A | * | 10/1993 | Donati | ................. E03D 5/006 |
| | | | | | 4/415 |

(56) References Cited

U.S. PATENT DOCUMENTS

| | | | | |
|---|---|---|---|---|
| 5,288,412 A * | 2/1994 | Voorhees | C02F 9/00 250/435 |
| 5,301,745 A * | 4/1994 | Seib | F24D 17/001 4/665 |
| 5,317,766 A * | 6/1994 | McDonald | E03B 1/04 4/415 |
| 5,345,625 A * | 9/1994 | Diemand | E03C 1/00 4/665 |
| 5,396,745 A * | 3/1995 | Klein | E03B 11/00 210/170.03 |
| 5,403,498 A * | 4/1995 | Morrissey | E03B 1/04 210/138 |
| 5,409,616 A * | 4/1995 | Garbutt | C02F 9/20 210/752 |
| 5,452,956 A * | 9/1995 | Gilliam | E03B 1/04 366/348 |
| 5,496,468 A * | 3/1996 | Cormier | B01D 29/58 210/172.3 |
| 5,498,330 A * | 3/1996 | Delle Cave | E03B 1/04 4/665 |
| 5,522,096 A * | 6/1996 | Brown | E03D 1/003 4/340 |
| 5,557,812 A * | 9/1996 | Sayant | E03D 5/003 4/665 |
| 5,573,677 A * | 11/1996 | Dembrosky | E03B 1/04 210/764 |
| 5,620,594 A * | 4/1997 | Smith | B01D 21/2466 210/523 |
| 5,759,387 A * | 6/1998 | Wilkes | B01D 24/4642 210/275 |
| 5,807,487 A * | 9/1998 | Lahti | C02F 1/5236 210/683 |
| 5,843,304 A * | 12/1998 | Marchesseault | B01D 21/0003 210/201 |
| 5,845,346 A * | 12/1998 | Johnson, Jr. | E03B 1/04 4/665 |
| 5,868,937 A * | 2/1999 | Back | E03B 1/04 210/651 |
| 5,885,459 A * | 3/1999 | Lerche | C02F 3/34 210/615 |
| 6,042,730 A * | 3/2000 | Lahti | C02F 1/58 210/667 |
| 6,066,262 A * | 5/2000 | Montgomery | C04B 22/004 106/819 |
| 6,106,716 A * | 8/2000 | Berkman | C02F 3/1242 210/197 |
| 6,132,138 A * | 10/2000 | Haese | C05F 7/00 210/170.07 |
| 6,139,729 A * | 10/2000 | Gonzalez, Jr. | E03B 1/04 210/170.08 |
| 6,282,733 B1 * | 9/2001 | Gonzalez, Jr. | E03B 1/04 4/665 |
| 6,299,775 B1 * | 10/2001 | Elston | C02F 9/00 210/744 |
| 6,314,590 B1 * | 11/2001 | Lee | E03D 5/003 4/597 |
| 6,328,882 B1 * | 12/2001 | Rosenblatt | E03D 5/003 210/534 |
| 6,355,160 B1 * | 3/2002 | Wiseman | C02F 1/001 210/90 |
| 6,361,695 B1 * | 3/2002 | Husain | B01D 61/145 210/639 |
| 6,379,546 B1 * | 4/2002 | Braun | C05F 3/04 210/167.3 |
| 6,383,369 B2 * | 5/2002 | Elston | C02F 9/00 210/150 |
| 6,425,148 B1 * | 7/2002 | Chen | E03D 1/003 4/664 |
| 6,458,268 B1 * | 10/2002 | Grandprey | C02F 1/686 210/199 |
| 6,519,787 B2 * | 2/2003 | Kim | E03D 5/016 4/321 |
| 6,523,186 B2 * | 2/2003 | Kim | E03D 5/016 210/194 |
| 6,616,834 B2 * | 9/2003 | Anderson | B01D 21/0024 210/162 |
| 6,673,251 B2 * | 1/2004 | Swales | C02F 1/78 210/764 |
| 6,688,048 B2 * | 2/2004 | Staschik | E03D 5/003 52/220.1 |
| 6,702,942 B1 * | 3/2004 | Nield | E03B 1/04 210/418 |
| 6,746,612 B2 * | 6/2004 | Hammond | C02F 1/50 210/764 |
| 6,804,843 B1 * | 10/2004 | Hung | E03B 1/04 4/414 |
| 6,838,000 B2 * | 1/2005 | Braun | C02F 9/00 210/603 |
| 6,887,375 B2 * | 5/2005 | Johnson | E03B 1/04 210/170.03 |
| 6,889,395 B1 * | 5/2005 | Hodges | E03B 1/04 4/441 |
| 6,904,926 B2 * | 6/2005 | Aylward | E03B 1/044 137/597 |
| 6,941,702 B1 * | 9/2005 | Abrams | E03B 1/041 137/376 |
| 6,942,800 B2 * | 9/2005 | Jungbauer | C02F 3/1242 210/610 |
| 6,969,460 B2 * | 11/2005 | Bertram | E03B 1/04 210/248 |
| 7,121,292 B2 * | 10/2006 | Aylward | E03B 1/04 137/119.01 |
| 7,147,771 B2 * | 12/2006 | Turley | C02F 3/12 210/196 |
| 7,207,748 B1 * | 4/2007 | Urban | E03B 1/042 405/51 |
| 7,267,235 B2 * | 9/2007 | Sharir | B01D 29/58 210/474 |
| 7,534,070 B1 * | 5/2009 | Urban | E03B 1/04 405/51 |
| 7,534,357 B2 * | 5/2009 | Markle | B63J 4/006 210/202 |
| RE41,761 E * | 9/2010 | Wiseman | E03D 5/003 210/90 |
| 7,854,852 B1 * | 12/2010 | Reavis | E03B 1/04 210/767 |
| 7,870,868 B1 * | 1/2011 | Ilalaole | E03D 5/003 4/395 |
| 7,913,331 B2 * | 3/2011 | Hartman | F28D 7/0066 4/665 |
| 8,074,933 B2 * | 12/2011 | Mackulin | B64C 1/1453 137/209 |
| 8,133,385 B2 * | 3/2012 | Premathilake | C02F 1/5236 210/182 |
| 8,141,185 B2 * | 3/2012 | Hoffjann | B64D 11/02 4/664 |
| 8,191,307 B2 * | 6/2012 | Donoghue | A01G 25/16 47/79 |
| 8,216,455 B1 * | 7/2012 | O'Brien | C02F 1/30 137/563 |
| 8,246,829 B2 * | 8/2012 | O'Regan, Jr. | C02F 3/30 210/628 |
| 8,308,937 B2 * | 11/2012 | Milani | C02F 1/001 210/127 |
| 8,377,291 B2 * | 2/2013 | Eckman | E03B 1/042 210/411 |
| 8,578,976 B1 * | 11/2013 | Davis | E03B 3/03 52/12 |
| 8,607,377 B2 * | 12/2013 | Borg | E03B 1/041 4/665 |
| 8,623,200 B2 * | 1/2014 | Williamson | C02F 1/001 210/253 |
| 8,696,897 B2 * | 4/2014 | Marugame | C02F 1/283 210/206 |
| 8,889,007 B2 * | 11/2014 | Lowe | C02F 3/043 210/85 |
| 8,920,657 B2 * | 12/2014 | Kawasaki | C02F 1/006 210/103 |

(56) References Cited

U.S. PATENT DOCUMENTS

| | | | |
|---|---|---|---|
| 8,931,510 B2* | 1/2015 | Gaertner | B61D 35/007 137/395 |
| 8,950,428 B2* | 2/2015 | Sly | E03B 1/041 137/357 |
| 9,074,356 B2* | 7/2015 | Tarantino | E03B 1/048 |
| 9,376,788 B1* | 6/2016 | Turner | E03B 1/042 |
| 9,458,028 B2* | 10/2016 | Boodaghians | C02F 1/001 |
| 9,517,946 B2* | 12/2016 | Lin-Hendel | E03B 1/042 |
| 9,611,161 B2* | 4/2017 | Yagita | C02F 1/02 |
| 9,644,350 B2* | 5/2017 | Khalifeh | B01D 36/005 |
| 9,663,924 B2* | 5/2017 | Turner | A47K 3/281 |
| 9,758,955 B1* | 9/2017 | Lee | E03D 5/003 |
| 9,783,963 B2* | 10/2017 | Yagita | E03B 7/074 |
| 9,809,479 B2* | 11/2017 | Prior | C02F 9/00 |
| 9,849,409 B2* | 12/2017 | Jones | E03B 1/041 |
| 9,908,122 B2* | 3/2018 | Cornille | E03B 1/044 |
| 9,908,797 B2* | 3/2018 | Tartakovsky | C02F 9/00 |
| 10,017,405 B2* | 7/2018 | Tartakovsky | C02F 11/13 |
| 10,046,982 B2* | 8/2018 | McIntosh | C02F 1/50 |
| 10,053,841 B2* | 8/2018 | Mahdjoubi Namin | A47K 3/281 |
| 10,132,083 B1* | 11/2018 | Casey | E03B 1/044 |
| 10,259,733 B2* | 4/2019 | Nakajima | C02F 3/12 |
| 10,315,136 B2* | 6/2019 | Eckman | B01D 29/68 |
| 10,315,930 B2* | 6/2019 | Yagita | E03B 1/042 |
| 10,407,332 B2* | 9/2019 | Prior | C02F 9/00 |
| 10,479,708 B2* | 11/2019 | Tartakovsky | C02F 11/06 |
| 10,538,901 B2* | 1/2020 | Coelho Nunes | E03B 1/042 |
| 10,578,225 B1* | 3/2020 | Mayorga | F16K 11/076 |
| 10,633,833 B2* | 4/2020 | Huang | E03D 5/003 |
| 10,675,570 B2* | 6/2020 | Wolff | B01D 61/22 |
| 10,697,155 B2* | 6/2020 | McKinney | E03B 1/041 |
| 10,704,234 B2* | 7/2020 | Baer | E03D 5/003 |
| 10,883,258 B2* | 1/2021 | Ridell | E03C 1/00 |
| 10,934,691 B2* | 3/2021 | Thompson | C02F 1/283 |
| 10,954,143 B2* | 3/2021 | Davidson, Jr. | C02F 1/02 |
| 10,968,114 B2* | 4/2021 | Vielma | C02F 1/281 |
| 11,071,259 B2* | 7/2021 | McClain | B05B 15/58 |
| 11,104,586 B2* | 8/2021 | Bertrand | C02F 1/001 |
| 11,220,440 B2* | 1/2022 | Majeric | B01D 1/0035 |
| 11,351,935 B2* | 6/2022 | Van Beek | B60R 15/00 |
| 11,365,532 B2* | 6/2022 | Cortes | E03B 7/07 |
| 11,441,297 B2* | 9/2022 | McKinney | E03B 1/041 |
| 11,447,939 B2* | 9/2022 | Pendlebury | A47K 3/28 |
| 11,479,954 B2* | 10/2022 | O'Neill | B01D 29/23 |
| 11,535,527 B2* | 12/2022 | Gaedker | B61D 35/00 |
| 11,536,013 B2* | 12/2022 | Massa | E03C 1/1222 |
| 11,549,250 B1* | 1/2023 | Barrett | E03D 5/003 |
| 11,598,075 B2* | 3/2023 | Maxant | E03B 1/041 |
| 11,713,561 B2* | 8/2023 | Kitagawa | A47K 3/20 4/602 |
| 11,746,513 B2* | 9/2023 | Massa | E03C 1/304 4/670 |
| 11,821,179 B2* | 11/2023 | Ridell | E03B 1/04 |
| 11,879,236 B2* | 1/2024 | Thompson | B01D 35/147 |
| 11,912,212 B2* | 2/2024 | Van Beek | B63B 29/14 |
| 11,912,213 B2* | 2/2024 | Van Beek | E03D 9/10 |
| 11,946,270 B2* | 4/2024 | Carter | B61D 35/005 |
| 11,974,526 B2* | 5/2024 | McClain | E03F 1/002 |
| 12,017,940 B2* | 6/2024 | Weaver | E03B 1/041 |
| 12,024,868 B2* | 7/2024 | Massa | E03C 1/304 |
| 12,071,747 B2* | 8/2024 | Han | C02F 1/001 |
| 12,134,568 B2* | 11/2024 | Mahdjoubi Namin | C02F 1/008 |
| 12,146,302 B2* | 11/2024 | Thompson | B01D 35/147 |
| 12,163,316 B2* | 12/2024 | Ridell | A61L 2/10 |
| 2002/0189173 A1* | 12/2002 | Staschik | F02G 1/043 52/79.1 |
| 2003/0070977 A1* | 4/2003 | Anderson | B01D 21/0033 210/301 |
| 2003/0070986 A1* | 4/2003 | Braun | C02F 9/00 210/620 |
| 2003/0094412 A1* | 5/2003 | Jungbauer | C02F 3/1242 210/620 |
| 2004/0045910 A1* | 3/2004 | Hoffjann | E03D 5/003 210/758 |
| 2004/0050429 A1* | 3/2004 | Aylward | E03B 1/04 137/870 |
| 2004/0129634 A1* | 7/2004 | Jungbauer | C02F 3/342 210/614 |
| 2004/0144704 A1* | 7/2004 | Johnson | E03B 1/04 210/170.03 |
| 2004/0168992 A1* | 9/2004 | Ben-Amotz | E03B 1/042 210/167.3 |
| 2004/0187205 A1* | 9/2004 | Hung | E03B 1/04 4/665 |
| 2005/0045228 A1* | 3/2005 | Labrador | E03B 1/02 137/357 |
| 2005/0056581 A1* | 3/2005 | Arguello | C02F 9/00 210/259 |
| 2005/0066439 A1* | 3/2005 | Korsinsky | E03B 1/04 4/665 |
| 2005/0205479 A1* | 9/2005 | Sharir | B01D 29/6423 210/121 |
| 2006/0091083 A1* | 5/2006 | Lumbert | C02F 1/78 210/205 |
| 2006/0144769 A1* | 7/2006 | Okros | E03B 1/04 210/123 |
| 2007/0068879 A1* | 3/2007 | Markle | C02F 9/00 210/202 |
| 2007/0174959 A1* | 8/2007 | Sanders | E03D 5/003 4/665 |
| 2007/0187338 A1* | 8/2007 | Lumbert | C02F 11/13 210/748.11 |
| 2008/0141455 A1* | 6/2008 | Harrison | E03B 1/04 4/665 |
| 2008/0173581 A1* | 7/2008 | Maclean | C02F 3/06 210/275 |
| 2008/0272057 A1* | 11/2008 | Tontegode | E03B 1/042 210/100 |
| 2009/0113620 A1* | 5/2009 | Fryan | E03D 1/003 4/665 |
| 2009/0178965 A1* | 7/2009 | Dai | C02F 1/006 210/143 |
| 2010/0122739 A1* | 5/2010 | Williamson | C02F 1/008 137/395 |
| 2010/0122945 A1* | 5/2010 | Williamson | E03B 1/042 210/104 |
| 2010/0125938 A1* | 5/2010 | Billon | E03D 5/006 4/317 |
| 2010/0200484 A1* | 8/2010 | Premathilake | C02F 1/5236 210/177 |
| 2010/0237021 A1* | 9/2010 | Guttau | B01D 61/18 210/791 |
| 2011/0024338 A1* | 2/2011 | Milani | C02F 1/008 210/96.1 |
| 2011/0163021 A1* | 7/2011 | Ehlert | C02F 3/1273 210/137 |
| 2011/0210049 A1* | 9/2011 | O'regan, Jr. | G05B 19/4185 210/85 |
| 2011/0278220 A1* | 11/2011 | Lowe | C02F 3/043 210/86 |
| 2011/0289672 A1* | 12/2011 | Cummings | E03B 1/04 4/603 |
| 2011/0308010 A1* | 12/2011 | Wierenga | B61D 35/007 4/653 |
| 2012/0024766 A1* | 2/2012 | McKinney | E03B 1/041 210/85 |
| 2012/0090707 A1* | 4/2012 | Marugame | C02F 1/283 137/565.01 |
| 2012/0091050 A1* | 4/2012 | Parkinson | C02F 1/004 210/209 |
| 2012/0110925 A1* | 5/2012 | Weber | E04B 1/3431 52/173.3 |
| 2012/0199220 A1* | 8/2012 | Knepp | E03B 1/041 137/558 |
| 2012/0228117 A1* | 9/2012 | Panunzio | C02F 9/00 203/10 |
| 2012/0261352 A1* | 10/2012 | Kawasaki | C02F 1/008 210/744 |

(56) References Cited

U.S. PATENT DOCUMENTS

| | | | | |
|---|---|---|---|---|
| 2012/0285563 | A1* | 11/2012 | Platteel | E03D 5/003 137/561 R |
| 2013/0048083 | A1* | 2/2013 | Sato | E03B 1/044 137/862 |
| 2013/0126402 | A1* | 5/2013 | Williamson | C02F 1/00 210/87 |
| 2013/0126433 | A1* | 5/2013 | Wolff | B01D 61/22 210/182 |
| 2013/0140233 | A1* | 6/2013 | Taniguchi | B01D 61/58 210/252 |
| 2013/0180928 | A1* | 7/2013 | Vielma | C02F 1/008 210/96.1 |
| 2013/0284679 | A1* | 10/2013 | Bailin | C02F 1/004 210/416.1 |
| 2013/0341289 | A1* | 12/2013 | Oades | C02F 9/00 210/759 |
| 2014/0008279 | A1* | 1/2014 | De Garay Arellano | E03B 1/041 210/137 |
| 2014/0021112 | A1* | 1/2014 | Boodaghians | C02F 9/00 210/102 |
| 2014/0033422 | A1* | 2/2014 | Christy | E03C 1/00 4/598 |
| 2014/0061112 | A1* | 3/2014 | Burd | B64D 11/02 210/234 |
| 2014/0116929 | A1* | 5/2014 | Williamson | B01D 29/90 210/88 |
| 2014/0138326 | A1* | 5/2014 | Boodaghians | C02F 1/001 210/791 |
| 2014/0230141 | A1* | 8/2014 | Erdmann | E03B 1/042 4/665 |
| 2014/0262982 | A1* | 9/2014 | Bailin | C02F 9/00 210/201 |
| 2014/0262998 | A1* | 9/2014 | Wagner | E03B 3/03 210/170.03 |
| 2014/0326331 | A1* | 11/2014 | Mimone | E03B 1/042 137/511 |
| 2014/0339803 | A1* | 11/2014 | Hammer | E03B 1/041 280/830 |
| 2015/0191365 | A1* | 7/2015 | Robb | C02F 1/76 210/138 |
| 2015/0204055 | A1* | 7/2015 | Khalifeh | C02F 1/008 210/137 |
| 2015/0321128 | A1* | 11/2015 | Gross | E03B 1/041 210/119 |
| 2015/0344323 | A1* | 12/2015 | Mahdjoubi Namin | A47K 3/281 210/86 |
| 2016/0016836 | A1* | 1/2016 | Sudnick | C02F 9/00 210/104 |
| 2016/0023217 | A1* | 1/2016 | Cornille | B60R 15/00 137/398 |
| 2016/0053425 | A1* | 2/2016 | Wolff | B01D 71/024 68/10 |
| 2016/0115675 | A1* | 4/2016 | Quigley | E03B 1/042 700/282 |
| 2016/0281338 | A1* | 9/2016 | Yagita | E03B 7/074 |
| 2016/0319522 | A1* | 11/2016 | Sparre | E03C 1/00 |
| 2016/0320074 | A1* | 11/2016 | Alsadah | F24H 9/2007 |
| 2016/0339368 | A1* | 11/2016 | McIntosh | C02F 1/50 |
| 2016/0340882 | A1* | 11/2016 | Lee | E03C 1/01 |
| 2016/0368802 | A1* | 12/2016 | Yagita | C02F 1/42 |
| 2016/0369483 | A1* | 12/2016 | Wade | C02F 1/006 |
| 2017/0088436 | A1* | 3/2017 | Espinoza | C02F 1/283 |
| 2017/0100684 | A1* | 4/2017 | Jones | B65D 85/00 |
| 2017/0145669 | A1* | 5/2017 | Klicpera | E03B 7/04 |
| 2018/0022618 | A1* | 1/2018 | Bertrand | C02F 1/001 210/103 |
| 2018/0127953 | A1* | 5/2018 | Noren | A47L 15/4225 |
| 2018/0201516 | A1* | 7/2018 | Mahdjoubi Namin | E03C 1/0408 |
| 2018/0354811 | A1* | 12/2018 | Vielma | C02F 1/008 |
| 2019/0047878 | A1* | 2/2019 | Thompson | B01D 35/143 |
| 2019/0048563 | A1* | 2/2019 | Thompson | C02F 1/686 |
| 2019/0085535 | A1* | 3/2019 | Huang | E03B 1/048 |
| 2019/0202713 | A1* | 7/2019 | Curlett | B01D 1/14 |
| 2019/0248496 | A1* | 8/2019 | Boodaghians | H01M 8/0662 |
| 2019/0323212 | A1* | 10/2019 | Stokes | E03B 3/03 |
| 2020/0017371 | A1* | 1/2020 | Gaedker | B61D 35/00 |
| 2020/0061499 | A1* | 2/2020 | Guan | E03D 1/00 |
| 2020/0087898 | A1* | 3/2020 | Spiro | E03B 1/041 |
| 2020/0181889 | A1* | 6/2020 | Baer | E03D 5/003 |
| 2020/0240121 | A1* | 7/2020 | McKinney | E03B 1/041 |
| 2020/0256041 | A1* | 8/2020 | Kitagawa | G06Q 10/06 |
| 2020/0291622 | A1* | 9/2020 | Baer | E03B 1/041 |
| 2020/0399154 | A1* | 12/2020 | Davidson, Jr. | C02F 1/76 |
| 2021/0047202 | A1* | 2/2021 | Ridell | C02F 1/008 |
| 2021/0147251 | A1* | 5/2021 | Valkieser | C02F 1/001 |
| 2021/0148095 | A1* | 5/2021 | Thompson | B01D 35/143 |
| 2021/0206657 | A1* | 7/2021 | Vielma | C02F 1/281 |
| 2021/0317019 | A1* | 10/2021 | Palmer | C02F 3/10 |
| 2021/0388581 | A1* | 12/2021 | Messerschmidt | E03F 7/04 |
| 2021/0404152 | A1* | 12/2021 | Eilmus | E03B 1/042 |
| 2021/0404153 | A1* | 12/2021 | Han | E03B 1/042 |
| 2022/0002985 | A1* | 1/2022 | Sansum | E03C 1/00 |
| 2022/0089458 | A1* | 3/2022 | Mahdjoubi Namin | C02F 9/00 |
| 2022/0098841 | A1* | 3/2022 | Öbrink | F24D 17/0005 |
| 2022/0145596 | A1* | 5/2022 | Thompson | E03B 1/042 |
| 2022/0162105 | A1* | 5/2022 | Wang | C02F 9/00 |
| 2022/0298046 | A1* | 9/2022 | Weaver | C02F 9/00 |
| 2022/0315447 | A1* | 10/2022 | Clarke | E03B 1/048 |
| 2022/0316191 | A1* | 10/2022 | Clarke | C02F 1/003 |
| 2022/0356090 | A1* | 11/2022 | Kumar | C02F 9/00 |
| 2023/0044004 | A1* | 2/2023 | Grooms | C02F 9/00 |
| 2023/0075157 | A1* | 3/2023 | Liu | G01F 23/00 |
| 2023/0132622 | A1* | 5/2023 | Bailin | B01D 61/18 210/636 |
| 2023/0167631 | A1* | 6/2023 | Haltmar | E03B 1/04 137/1 |
| 2024/0018755 | A1* | 1/2024 | Öbrink | E03C 1/044 |
| 2024/0018761 | A1* | 1/2024 | Sansum | E03B 1/041 |
| 2024/0035259 | A1* | 2/2024 | Ridell | E03C 1/12 |
| 2024/0035260 | A1* | 2/2024 | Mahdjoubi Namin | E03B 1/04 |
| 2024/0069513 | A1* | 2/2024 | Kitagawa | C02F 1/008 |
| 2024/0410140 | A1* | 12/2024 | Han | E03C 1/01 |

FOREIGN PATENT DOCUMENTS

| | | |
|---|---|---|
| CN | 110593350 A | 12/2019 |
| CN | 211226721 U | 8/2020 |

* cited by examiner

INDOOR GREY WATER PURIFICATION AND REUSE DEVICE, SYSTEM AND METHOD FOR PUBLIC BUILDINGS

CROSS REFERENCE TO RELATED APPLICATIONS

The present application claims priority of 5 Chinese patent applications filed in Aug. 13, 2020, wherein the 5 Chinese patents are:
1. an indoor reclaimed water reuse system and method for public buildings, application number: 202010813150X; 2. an indoor reclaimed water reuse system for public buildings, application number: 202021685608X; 3. an indoor reclaimed water reuse device for public buildings, application number: 2020108133488; 4. an indoor reclaimed water reuse device for public buildings, application number: 2020216842405; 5. an indoor reclaimed water reuse control system and method for public buildings, application number: 2020108135055.

The entirety of the above-mentioned 5 patent applications are herein incorporated by reference.

TECHNICAL FIELD

The present application pertains to the technical field of urban water conservation, in particular to indoor grey water purification and reuse device, system and method for public buildings.

BACKGROUND ART

In recent years, with the rapid development of urban economy, the demand of people for social services is increased, and the proportion of public buildings in urban buildings is gradually increased, so that the proportion of public buildings water consumption in total town water consumption is continuously increased. Under the general background of urban high-efficiency water conservation, urban public buildings water conservation becomes an important work of urban water conservation, and improvement of water use efficiency and deep excavation of non-traditional water resources are important ways to solve the problem of water shortage. In domestic and overseas green building standards, corresponding researches on water use efficiency, sustainable management and rainwater utilization are carried out and specific requirements are put forward. Recent researches show that sewage treatment and reuse are relatively important and sustainable water resources, and this part of water resources are not fully developed and utilized, so that the sewage treatment and reuse becomes the most stable water supply source.

The existing reclaimed water reuse treatment technology is roughly divided into three types, namely coagulation and filtration, biological treatment sedimentation and membrane separation, wherein the first two types require large area and long time for treatment, while the third type requires small area and has a fast and simple process, so that it is more and more practical in practical life and is favored by people. A large amount of high-quality miscellaneous drainage (such as lavatories, washing sinks, and shower room etc.) is discharged in daily life in public buildings (such as schools, hotels and office buildings etc.), the treatment cost of which is low, and the technical requirement of the treatment is also low. By collecting, filtering, precipitating, purifying and disinfecting the high-quality miscellaneous drainage to form reclaimed water, the reclaimed water is sent to water consumption points (mainly used for toilet flushing) so as to reduce the consumption of traditional tap water.

In April 2015, the state council of the PRC issued "Action Plan for Prevention and Control of Water Pollution", encouraging residential buildings to use reclaimed water in buildings, and to collect grey water with light pollution used for such as washing clothes, bathing and living miscellaneous for toilets flushing in sequence after properly treated. At present, the indoor grey water reuse technology in the market is a modularized indoor reclaimed water technology suitable for dwellings, which is a technology that collects domestic miscellaneous water of a floor through reducing the height of the floor, for toilet flushing using after being filtered and disinfected. The water consumption ratio of the residential buildings is respectively as follows: toilet flushing 21%, showering 29.3%-32%, clothes washing 22.7%-22%, hands and face washing 6.7%-6.0% and kitchen 20%-19%. As the technology mainly depends on high-quality miscellaneous drainage of residential laundry, bath and hands and face washing, the grey water amount is abundant and the reuse requirement of residential toilet flushing can be completely met, so that water supplement through tap water is not required. Meanwhile, the treated water is directly recycled to toilet water tanks, so that the pressure control precision of recycled reclaimed water is not high. However, this technique is not suitable for public buildings. Taking office buildings and teaching buildings, which have the highest proportion in public buildings, as examples, the water consumption ratio of the public buildings is respectively as follows: toilet flushing water 60%-66% and hands and face washing water 40%-34%. On one hand, by collecting high-quality miscellaneous drainage represented by hands and face washing water cannot meet the requirement of all toilet flushing water consumption, so that overall design on water source supplementing and controlling method is required. On the other hand, the flushing of closet pans and urinals in public buildings has basically eliminated tank-type flushing, and water-using facilities are directly connected with water supply pipelines, so that water volume and water pressure requirements for flushing are need to be met at the same time.

SUMMARY OF THE INVENTION

In view of the above analysis, the present application aims to provide indoor grey water purification and reuse device, system and method for public buildings, so as to solve the problem that cascaded cycling and use of indoor water and automatic control for stable operations cannot be realized in public buildings, and to realize the stable operation of collecting, treating and reusing the indoor grey water of the public buildings.

The objects of the present application are mainly realized by the following technical schemes:
on one aspect, an indoor grey water purification and reuse device for public buildings is provided, which comprises a grey water storage tank, a grey water treatment assembly and a pneumatic reclaimed water tank assembly which are sequentially arranged from top to bottom; the grey water storage tank is used for storing the grey water from one floor above collected by the grey water collecting device; the grey water treatment assembly is used for carrying out multistage purification treatment on the grey water in the grey water storage tank; and the pneumatic reclaimed water tank assembly is used for disinfecting reclaimed water subjected to multistage purification treatment and supplying water to reclaimed water reuse facilities on the current floor in constant pressure.

Further, a liquid level sensor is arranged in the grey water storage tank, which is used for monitoring the water level state in the grey water storage tank; An alarm liquid level, a low liquid level, a high liquid level and an overflow liquid level are arranged in sequence from low to high, wherein the low liquid level is a start filling water liquid level, and the high liquid level is a stop filling water liquid level.

Further, a lower edge of a tap water supply port is 150 mm higher than the overflow liquid level.

Further, the grey water treatment assembly includes a first-stage purification assembly, a second-stage purification assembly and a third-stage purification assembly connected in sequence.

Further, a built-in capacity ratio of the first-stage purification assembly, the second-stage purification assembly and the third-stage purification assembly is 2:2:1.

Further, the grey water treatment assembly also comprises a variable frequency pump, ultrafiltration membrane backwashing pipe and a backwashing electromagnetic valve; wherein the variable frequency pump is used for pressurizing the grey water collected in the grey water storage tank and then feeding the grey water into the first-stage purification assembly; the ultrafiltration membrane backwashing pipe is used for discharging impurities after ultrafiltration membrane backwashing is carried out, and discharging the liquid after the backwashing to the sewage standpipe; and the backwashing electromagnetic valve is used for controlling the backwashing process of the ultrafiltration membrane.

Further, the pneumatic reclaimed water tank assembly comprises a pneumatic water tank, a pressure gauge, a dosing tank, a metering pump and reclaimed water supply pipe; the pressure gauge is connected with the pneumatic water tank; the dosing tank is connected with the pneumatic water tank through the metering pump; and the pneumatic reclaimed water tank is connected with water-using facilities on the current floor through the reclaimed water supply pipe.

Further, the internal pressure of the pneumatic water tank is 0.15-0.20 MPa.

Further, the pneumatic reclaimed water tank assembly further comprises an ultraviolet sterilizer which is arranged inside the pneumatic water tank or at a reclaimed water outlet of the pneumatic water tank.

Further, the reclaimed water outlet of the pneumatic reclaimed water tank assembly is connected with the grey water storage tank through reclaimed water circulating pipeline, and a cycling switch is arranged on the reclaimed water circulating pipeline and can be automatically controlled.

On another aspect, an indoor reclaimed water reuse system for public buildings is provided, which comprises a grey water collecting device, a tap water supply device, a reclaimed water reuse control system and the grey water purification and reuse device; the grey water collecting device is used for collecting grey water generated from one floor above, and the grey water purification and reuse device is used for purifying and disinfecting the grey water, and the purified and disinfected reclaimed water is used by reclaimed water reuse facilities on the current floor; the tap water supply device is used for replenishing water to the grey water purification and reuse device, and the reclaimed water reuse control system is used for integrally controlling the indoor reclaimed water reuse system for public buildings.

Further, the grey water collecting device is connected with a reclaimed water inlet of the grey water purification and reuse device through grey water feeding pipe; the tap water supply port of the grey water purification and reuse device is connected with the tap water supply device through tap water supply pipe; the reclaimed water outlet of the grey water purification and reuse device is connected with reclaimed water reuse facilities on the current floor.

Further, the grey water purification and reuse device is of a box-type structure and is placed at the side wall of the toilet.

Further, the grey water purification and reuse device is installed in a floor standing mode, and the box-type structure is detachably connected with the wall body.

Further, the reclaimed water circulation purification control assembly comprises the cycling switch which is arranged on the reclaimed water circulating pipeline, and because the reclaimed water in the pneumatic water tank has certain pressure, a circulation purification controller can control the opening of the cycling switch to enable the water to be circularly purified in the pneumatic water tank to be supplied to the grey water storage tank along the circulating pipeline, and the circulating purification treatment is carried out along with the new round of water production process.

Further, the disinfection control assembly comprises a disinfection controller which controls the metering pump to quantitatively feed disinfectant into the pneumatic water tank according to the water yield of the variable frequency pump, and the disinfectant is fed in equal proportion by combining the water yield, so that the disinfection of reclaimed water is realized.

Further, the display and alarm assembly comprises a display screen and an alarm, wherein the display screen is used for displaying liquid level, disinfectant and filtering volume of purification assembly, and the alarm is used for giving alarm on water shortage of the grey water storage tank, insufficient disinfectant and maintenance of consumable materials of the purification assembly; the alarm mode of the alarm comprises sound and color alarm, wherein the sound alarm is a sound alarm with the sound of not less than 80 decibels, and the color alarm is that the background color of the display screen is displayed in red, and the alarm can be eliminated through screen operation after the fault alarm is processed.

On another aspect, an indoor reclaimed water reuse method for public buildings is also provided, which is based on the indoor reclaimed water reuse system for public buildings, and the method comprises the following steps:
  step 1: the grey water collecting device collects the grey water from one floor above and supplies the grey water from one floor above to the grey water purification and reuse device of the current floor;
  step 2: the grey water purification and reuse device performs multistage purification treatment on the supplied grey water, and pressurizes the reclaimed water subjected to multistage purification treatment and disinfection for the reclaimed water reuse facilities on the current floor to use.

Compared with the prior art, the indoor grey water purification and reuse device, system and method for public buildings have at least one of the following advantageous effects:
  a) through setting up split-level drainage system, the high-quality miscellaneous drainage from one floor above is collected for toilet (closet pans and/or urinals) on the current floor to use after purification and disinfection, so as to realize the target of distributed split-level drainage, and solve the problem that it is difficult to collect life miscellaneous water in public buildings.

b) The grey water purification and reuse device is of a box-type structure and is vertically arranged, and the grey water storage tank, the grey water treatment assembly and the pneumatic reclaimed water tank assembly are sequentially arranged from top to bottom, so that the gravitational potential energy of water can be better utilized to reduce the operation energy consumption of the grey water purification and reuse device; the structure is compact, and the occupied space of the concentrated treatment of the miscellaneous water is greatly reduced by combining the space layout inside a large-scale public building toilet, so that the grey water purification and reuse device is more flexible and convenient to install, and the potential safety hazard of misconnection of water supply standpipe and reclaimed water pipe is avoided.

c) The water consumption ratio in a public building is respectively as follows: hands and face washing water 34%-40% and toilet flushing water 60%-66%, so that all the hands and face washing water (high-quality miscellaneous drainage) can be collected and reused to greatly reduce the tap water consumption for flushing toilets, and therefore comprehensive water saving of the public building is achieved. Except the top floor, the system can save water by 34-40%, and has important value and significance for reducing water resource consumption of public buildings and improving the utilization efficiency of non-traditional water resources.

d) The grey water purification and reuse device can carry out multistage purification treatment to the collected grey water to intercept and purify large particles, small particles and fine microorganisms in the grey water, and the high-standard water outlet requirement is met by dosing disinfection and ultraviolet disinfection, so that the safety of reclaimed water reuse is ensured.

e) The reclaimed water reuse control system with high intelligent control level is adopted, and smooth proceeding of various links of 'water inlet-water storage-disinfection-water supply' is realized through various intelligent management and control modes to guarantee the realization of reclaimed water treatment target, reduce the equipment failure rate, and greatly improve the reliability and stability of system operation.

In the present application, technical schemes described above can be combined with each other to realize more preferable combination schemes. Additional features and advantages of the present application will be set forth in the description which follows, and some advantages will be obvious from the description, or may be learned by the practice of the present application. The objectives and other advantages of the present application will be realized and attained by the structure particularly pointed out in the description and drawings.

BRIEF DESCRIPTION OF DRAWINGS

The drawings, in which like reference numerals refer to like parts throughout, are for the purpose of illustrating particular embodiments only and are not to be considered to limit the present application.

Figure 1:
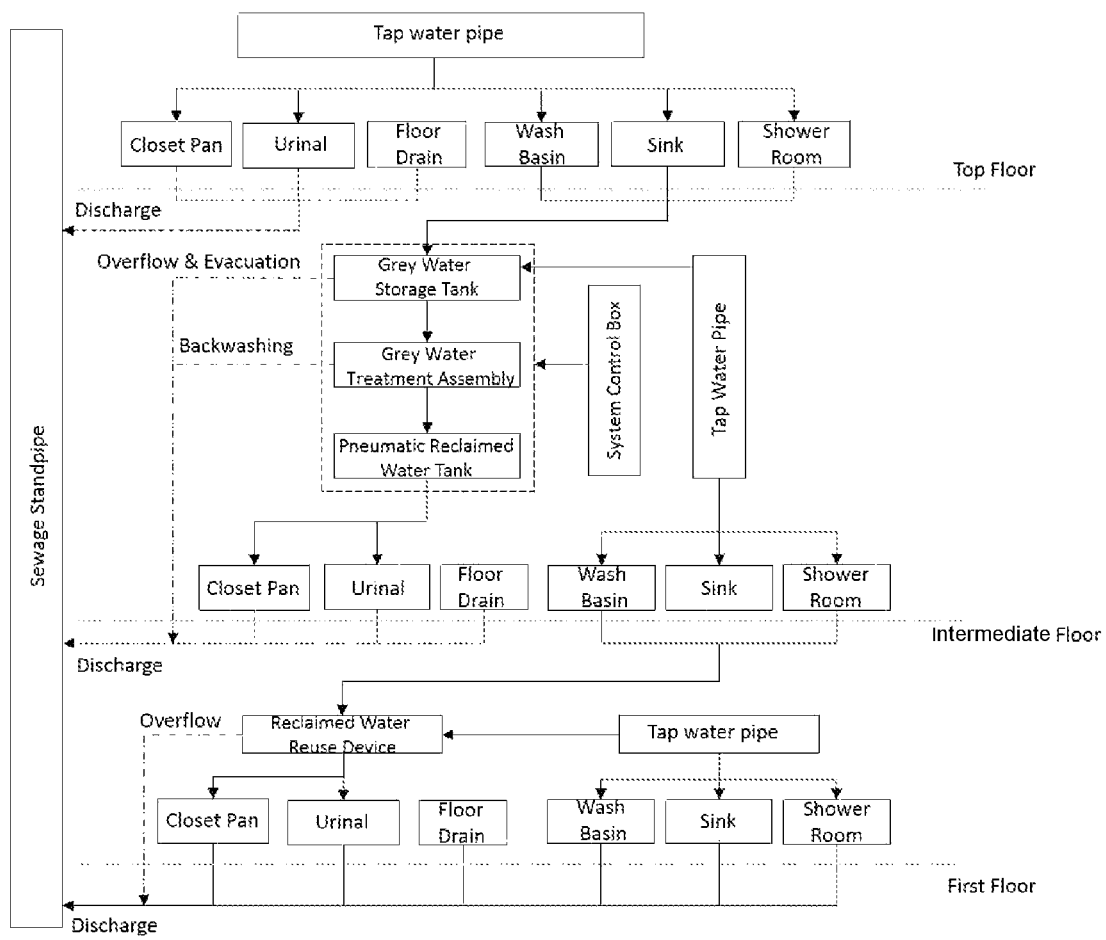
FIG. 1 is a schematic diagram of a reclaimed water reuse process of an indoor reclaimed water reuse system in public buildings in an embodiment of the present application.

Reference numerals are as follows:
1. grey water storage tank; 1-1. grey water feeding pipe; 1-2. hair filter; 1-3. overflow pipe; 1-4. evacuation pipe; 1-5. manual evacuation valve; 1-6. control valve; 1-7. automatic water supply valve; 1-8. manual water supply valve; 1-9. tap water supply pipe; 1-10. liquid level sensor; 1-11. stop filling water level; 1-12. start filling water level; 2. grey water treatment assembly; 2-1. variable frequency pump; 2-2. first-stage purification assembly; 2-3. second-stage purification assembly; 2-4. third-stage purification assembly; 2-5. check valve; 2-6. backwashing electromagnetic valve; 2-7. ultrafiltration membrane backwashing pipe; 3. pneumatic reclaimed water tank assembly; 3-1. pressure gauge; 3-2. dosing tank; 3-3. metering pump; 3-4. reclaimed water circulating pipeline; 3-5. ultraviolet sterilizer; 3-6. reclaimed water supply pipe; 3-7. cycling switch; 4. sewage standpipe; 5. Shower room; 6. sink; 7. wash basin; 8. grey water purification and reuse device; 9. tap water supply port; 10. overflow drain port; 11. reclaimed water outlet; 12. closet pan; 13. urinal; 14. floor drain; 15. water supply standpipe.

DETAILED DESCRIPTION OF THE INVENTION

The preferred embodiments of the present disclosure will now be described in detail with reference to the accompanying drawings, which form a part hereof, and which together with the embodiments of the present disclosure serve to explain the principles of the present disclosure and are not considered as limitation to the present disclosure.

Embodiment 1

Figure 2:
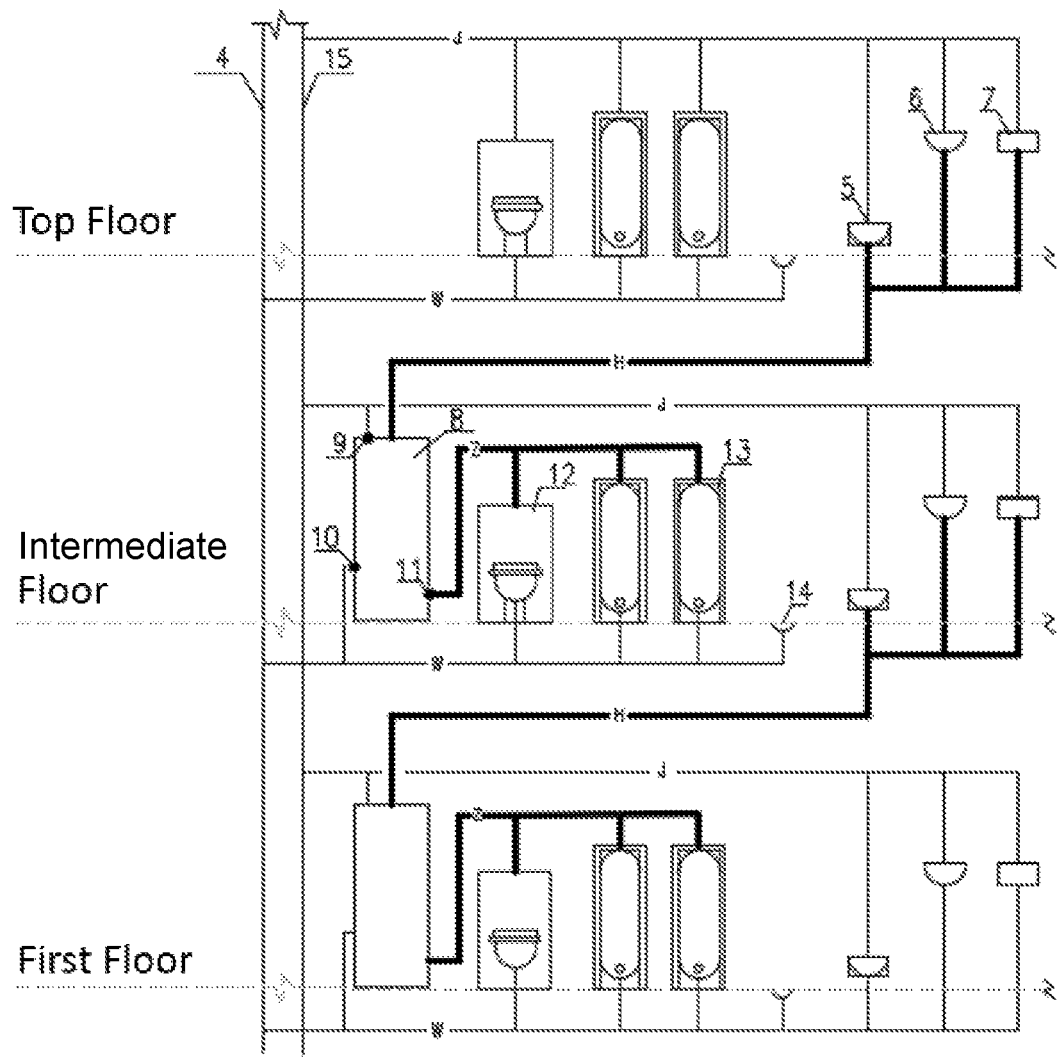
FIG. 2 is a schematic structural diagram of the indoor reclaimed water reuse system of in public buildings in an embodiment of the present application.

An embodiment of the present application discloses an indoor reclaimed water reuse system for public buildings, as shown in FIG. 2, including a grey water collecting device, a grey water purification and reuse device 8, a tap water supply device and a reclaimed water reuse control system.

The grey water collecting device is used for collecting grey water generated by water-using facilities such as shower rooms 5, sinks 6 and wash basins 7 on one floor above, and the grey water collecting device is connected with the water-using facilities that generates high-quality grey water (namely high-quality miscellaneous drainage) such as the shower rooms 5, the sinks 6 and the wash basins 7 on one floor above through grey water collecting pipelines.

The grey water collecting device is connected with a reclaimed water inlet of the grey water purification and reuse device 8 through grey water feeding pipe 1-1. The grey water purification and reuse device 8 is used for purifying and disinfecting grey water collected by the grey water collecting devices, and the tap water supply device is used for replenishing water into the grey water purification and reuse devices 8 to keep liquid level in the grey water purification and reuse devices 8 stable, so that purified and disinfected reclaimed water in the grey water purification and reuse devices 8 can meet the requirement of reclaimed water reuse facilities on the current floor in the building.

A tap water supply port 9 of the grey water purification and reuse device 8 is connected with a tap water supply device through tap water supply pipe 1-9, and the tap water supply device is connected into tap water pipe; and a reclaimed water outlet 11 of the grey water purification and reuse device 8 is connected with reclaimed water reuse facilities on the current floor. A liquid level sensor 1-10 is arranged in the grey water purification and reuse device 8, which is used for sensing high and low water level states in a grey water storage tank 1.

The reclaimed water reuse control system is used for integrally controlling the indoor reclaimed water reuse system for public buildings, which is connected with the grey water collecting device, the tap water supply device and the grey water purification and reuse device 8 in a wired or wireless mode, realizing collecting grey water, purifying and disinfecting reclaimed water and replenishing tap water automatically by controlling valves, pumps, the liquid level sensor and the like in various devices. The system can also display real-time working state of each main functional component of the system in the running process and give alarm for water shortage in the grey water storage tank, insufficient disinfection dosage, up-to-standard service life of consumable materials of purification assembly and the like.

The process of reusing the reclaimed water by using the indoor reclaimed water reuse system for public buildings of the embodiment is shown in FIG. 1, and an indoor reclaimed water reuse method for public buildings includes the following steps:

step 1: the grey water collecting device collects the grey water from one floor above and supplies the grey water one floor above to the grey water purification and reuse device 8 of the current floor. The grey water collecting device collects grey water generated by water-using facilities such as shower rooms 5, sinks 6, wash basins 7 and the like on one floor above, and the collected grey water is discharged into the grey water purification and reuse device 8 on the current floor through the grey water feeding pipe 1-1.

step 2: the grey water purification and reuse device 8 performs multistage purification treatment on the supplied grey water, and pressurizes the reclaimed water subjected to multistage purification treatment for the reclaimed water reuse facilities on the current floor to use.

The grey water entering the grey water purification and reuse device 8 is subjected to coarse filtration, precipitation, fine filtration, disinfection and pressurization treatment. The adopted coarse filtration measure is a hair filter, and the precipitation measure is flocculation and evacuation. The fine filtration measure comprises the following steps: primary grid, static settlement, PP (polypropylene) cotton filtration, active carbon filtration and super-permeation membrane filtration, intercepting and purifying large particles, small particles and fine microorganisms, and finally achieving the high-standard water outlet requirement through dosing disinfection and ultraviolet disinfection. And the reclaimed water after the multistage purification treatment enters a pneumatic water tank for pressurization, and is supplied to reclaimed water reuse facilities on the current floor after pressurization.

Further, a pre-filtering assembly is arranged on the grey water storage tank 1 of the grey water purification and reuse device 8, which is used for pre-filtering supplied grey water to intercept impurities such as hair and large particles in the grey water. The grey water after pre-filtering treatment enters a grey water treatment assembly 2, in which the grey water is subjected to three-level purification through PP cotton, activate carbon and a ultrafiltration membrane, then enters the pneumatic water tank. After that, the grey water is subjected to quantitative dosing disinfection through a metering pump 3-3 and then is conveyed to the reclaimed water outlet 11 at a constant pressure for closet pans 12 and/or urinals 13 on the current floor to use. Sewage generated by the closet pans 12, the urinals 13 and floor drains 14 is directly discharged into sewage standpipe 4.

When the liquid level in the grey water purification and reuse device 8 reaches a start filling water level 1-12, the reclaimed water reuse control system controls the tap water supply device to supply water in real time. That is to say, when the grey water in the grey water purification and reuse device 8 is not enough, the reclaimed water reuse control system receives signals from the liquid level sensor 1-10, and a display of the control device displays 'water shortage', so that the tap water supply port 9 opens and starts to supply water. And the display of the control device displays 'normal' along with the rise of the liquid level of the grey water storage tank 1 in the grey water purification and reuse device 8, and the tap water supply port 9 is closed. Wherein, an ultrafiltration membrane of the grey water treatment assembly 2 carries out automatic backwashing every one week, and is controlled by the control device, and an ultrafiltration membrane backwashing pipe 2-7 and an overflow pipe 1-3 are discharged into the sewage standpipe 4 through an overflow drain port 10.

When the disinfectant content in the grey water purification and reuse device 8 is insufficient, the reclaimed water reuse control system carries out warning prompt. When the dosing amount in the pneumatic reclaimed water tank assembly 3 is insufficient, the control system receives a signal uploaded by the metering pump 3-3, and the display of the control device displays ' disinfectant shortage'. At this point, the disinfectant is added through manual operation. When the dosing is finished, the display of the control system displays 'normal', and the metering pump 3-3 works normally.

Compared with the prior art, the indoor reclaimed water reuse system for public buildings provided by the embodiment has the following advantageous effects:

(1) Through setting up split-level drainage system, the high-quality miscellaneous drainage from one floor above is collected for toilet (closet pans and/or urinals) on the current floor to use after purification and disinfection, so as to realize the target of distributed split-level drainage, and solve the problem that it is difficult to collect life miscellaneous water in public buildings.

(2) The water consumption ratio in a public building is respectively as follows: hands and face washing water 34%-40% and toilet flushing water 60%-66%, so that all the hands and face washing water (high-quality miscellaneous drainage) can be collected and reused to greatly reduce the tap water consumption for flushing toilets, and therefore comprehensive water saving of the public building is achieved. Except the top floor, the system can save water by 34-40%, and has important value and significance for reducing water resource consumption of public buildings and improving the utilization efficiency of non-traditional water resources.

(3) The grey water purification and reuse device can carry out multistage purification treatment to grey water, and purification efficiency is high. The adoption of multistage purification treatment measure can intercept and purify large particles, small particles and fine microorganisms, and the high-standard water outlet requirement is met through dosing disinfection and ultraviolet disinfection.

(4) The system adopts a reclaimed water reuse control system with high intelligent control level, ensuring the realization of treatment target and reducing the equipment failure rate through various intelligent control modes.

Embodiment 2

Figure 3:
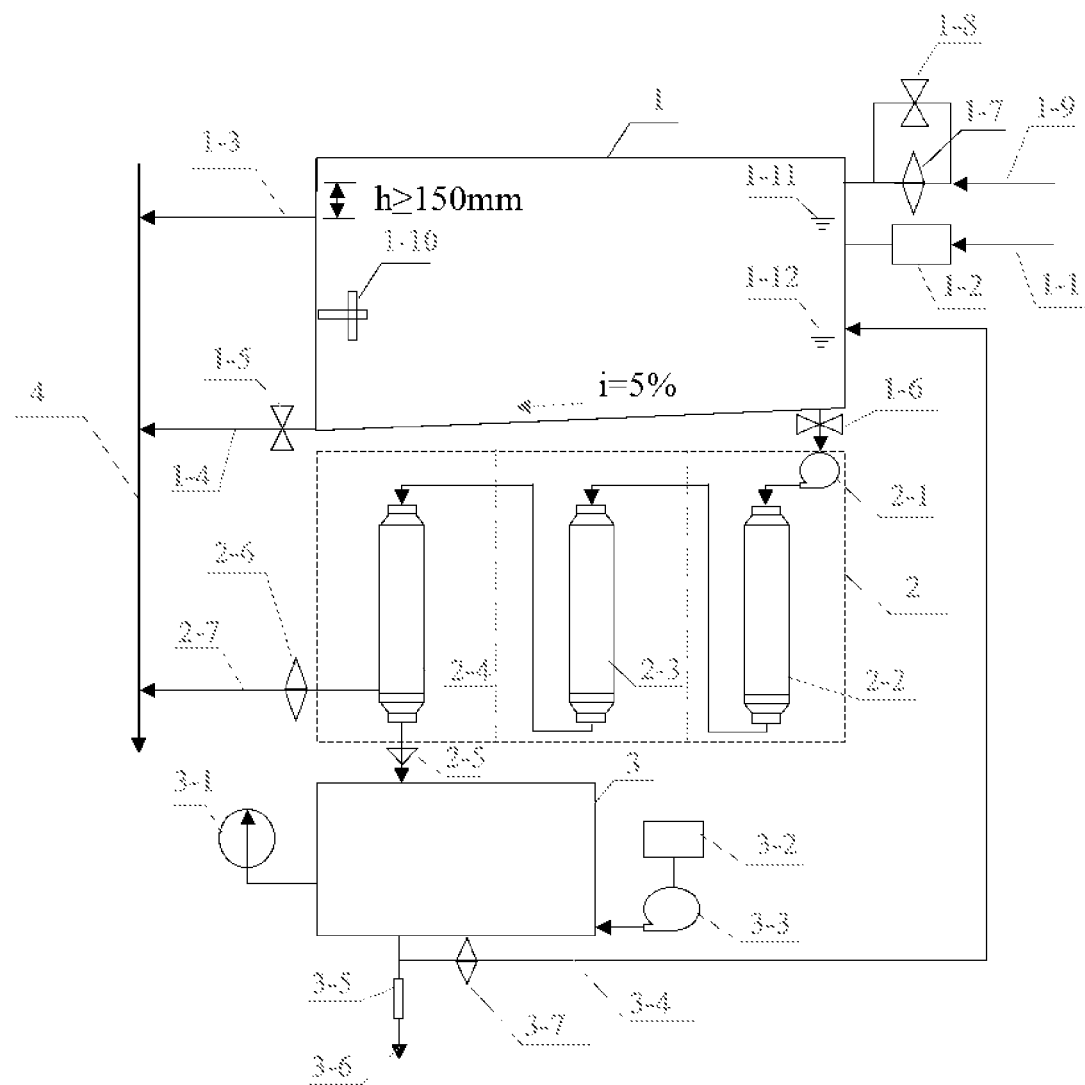
FIG. 3 is a schematic structural diagram of a grey water purification and reuse device in an embodiment of the present application.

In another specific embodiment of the present application, the grey water purification and reuse device 8 in embodiment 1 is disclosed, as shown in FIG. 3. The indoor grey water purification and reuse device for public buildings includes the grey water storage tank 1, the grey water treatment assembly 2, and the pneumatic reclaimed water tank assembly 3; wherein, the grey water storage tank 1 is used for collecting and storing grey water generated by sinks 6, wash basins 7 and shower rooms 5 on one floor above; the grey water treatment assembly 2 is used for carrying out multistage purification treatment on the grey water stored in the grey water storage tank 1; and the pneumatic reclaimed water tank assembly 3 is used for supplying purified reclaimed water to reclaimed water reuse facilities (toilet flushing water consuming points) of the current floor in constant pressure after being disinfected.

In the embodiment, the grey water purification and reuse device 8 is vertically arranged, and the grey water storage tank 1, the grey water treatment assembly 2 and the pneumatic reclaimed water tank assembly 3 are sequentially arranged in the grey water purification and reuse device 8 from top to bottom, so that the gravitational potential energy of water can be better utilized to reduce the operation energy consumption of the grey water purification and reuse device. The grey water purification and reuse device 8 is of a box-type structure, and is placed at the side wall of a toilet and is installed in a floor standing mode. The box-type structure is detachably connected with the wall body, such as connected though rivets, so that the connection is good in stability. The grey water purification and reuse device 8 with a box-type structure comprises a device module and an outer decoration module, wherein the grey water storage tank 1, the grey water treatment assembly 2 and the pneumatic reclaimed water tank assembly 3 which are arranged in parallel form the device module, the thickness of which is 30 cm, the structural form flat, the width 100 cm, and the height 2200 cm. The outer decoration module is a box-type structure shell, which can be adjusted by combining with actual site conditions. It is arranged from floor to ceiling, and consists of a fixed part and an openable part, and ceramic tiles or other decoration materials can be hung on the external wall and are matched with the toilet decoration environment.

In the embodiment, the grey water storage tank 1 is provided with the reclaimed water inlet, the tap water supply port 9 and the overflow drain port 10, wherein the interior of the grey water storage tank 1 is provided with the liquid level sensor 1-10, a high liquid level point and a low liquid level point, and the bottom of the pneumatic reclaimed water tank assembly 3 is provided with the reclaimed water outlet 11. Wherein, the liquid level sensor 1-10 is used for sensing the water level state in the grey water storage tank 1, and adopts a float valve liquid level sensor; the reclaimed water inlet of the grey water storage tank 1 is connected with high-quality miscellaneous drainage water-using facilities on one floor above through the grey water feeding pipe 1-1, and the hair filter 1-2 is arranged on the grey water feeding pipe 1-1, which is used for pre-filtering sundries such as hair, toilet paper and the like in the grey water before entering the grey water storage tank 1. The overflow drain port 10 of the grey water storage tank 1 is connected with the sewage standpipe 4 through the overflow pipe 1-3 which is used for discharging reclaimed water at a high liquid level in the grey water storage tank 1, and a drain outlet at the bottom of the grey water storage tank 1 is connected with the sewage standpipe 4 through evacuation pipe 1-4; the evacuation pipe 1-4 is provided with an manual evacuation valve 1-5, by controlling which sediment at the bottom of the grey water collecting tank is discharged through the evacuation pipe 1-4 under the action of gravity. The tap water supply port 9 of the grey water storage tank 1 is connected with a water supply standpipe 15 of the public building through the tap water supply pipe 1-9, and the reclaimed water outlet 11 of the pneumatic reclaimed water tank assembly 3 is connected with reclaimed water reuse facilities of the current floor; the tap water supply 1-9 is provided with an automatic water supply valve 1-7 and/or a manual water supply valve 1-8, wherein the automatic water supply valve 1-7 is used for automatically controlling the tap water pipe to replenish water to the grey water storage tank 1, and the manual water supply valve 1-8 is used for manually controlling tap water to replenish water. The water outlet of the grey water storage tank 1 is connected with the water inlet of the grey water treatment assembly 2 through a first drainage pipe, and a control valve 1-6 is arranged on the first drainage pipe, which is used for controlling drainage pipe of the grey water storage tank 1 connected with the grey water treatment assembly 2 and metering the quantity of grey water fed into the grey water treatment assembly 2; the grey water treatment assembly 2 is connected with the pneumatic reclaimed water tank assembly 3 through a second drainage pipe, and a check valve 2-5 is arranged on the second drainage pipe, which is used for preventing reclaimed water in the pneumatic reclaimed water tank assembly 3 from being poured into the grey water treatment assembly 2.

Furthermore, the bottom surface of the grey water storage tank 1 is a slope surface, so that particles and flocs in the grey water can slide down and gather along the slope surface under the action of gravity. The slope of the slope surface is 5%, and the evacuation pipe 1-4 is arranged along the slope of the slope surface. The drain outlet is arranged at the bottom end of the slope surface, and the gathered particles and flocs are drained to the sewage standpipe 4 through the evacuation pipe 1-4 under the action of gravity by opening the manual evacuation valve 1-5.

Further, the grey water storage tank 1 is provided with an overflow liquid level and a start filling water level, and the lower edge of the tap water supply port 9 is 150 mm higher than the overflow liquid level, so that the stored grey water is prevented from flowing backwards to pollute tap water. That is, the tap water supply port 9 is positioned above the overflow drain port 10. The tap water supply pipe 1-9 and the overflow pipe 1-3 are horizontally arranged in parallel, and the tap water supply pipe 1-9 is higher than the overflow pipe 1-3, and the vertical distance between the center line of the tap water supply pipe 1-9 and the center line of the overflow pipe 1-3 is no less than 150 mm; the high liquid level line is flush with the overflow pipeline, and the low liquid level line is 50 mm higher than the slope top of the bottom surface of the grey water storage tank 1, and tap water supplement is started when the liquid level drops to the low liquid level line.

In this embodiment, the grey water treatment assembly 2 includes multistage purification assemblies. Illustratively, the grey water treatment assembly 2 includes a first-stage purification assembly 2-2, a second-stage purification assembly 2-3, and a third-stage purification assembly 2-4 connected in sequence. Wherein, the first-stage purification assembly 2-2 is used for filtering large particles, non-dissolved metal oxides, broken hairs and the like in the grey water. Furthermore, the first-stage purification assembly 2-2 adopts PP cotton/coarse filter screen, and the PP cotton is made of polyester fiber, which has pre-purification effect to filter colloid impurities with the diameter more than 5 μm in the grey water; the second-stage purification assembly 2-3 is used for filtering small-size particles, organic pollutants, chromatic substances, heavy metal ions and the like in the grey water. Further, the second-stage purification assembly 2-3 adopts modified granular activate carbon column, and the activate carbon is a carbide with a rich surface microporous structure, and the diameter of microporous is 2-50 nm, to treat acid and alkali substances in the grey water. The third-stage purification assembly 2-4 is used for intercepting turbidity substances, macromolecular organic matters, bacteria and partial viruses, improving the sensory effect of water production and reducing the quantity of microorganisms. Furthermore, the third-stage purification assembly 2-4 adopts internal pressure type ultrafiltration membrane which is a semipermeable polymeric membrane, and the pressure is used as a driving force. The membrane aperture is 1-100 nm, and the pore-density is about 10/cm, to remove colloid-grade particles and macromolecules and separate a solution with the concentration less than 10%. The water outlet of the third-stage purification assembly 2-4 is connected with the water inlet of the pneumatic reclaimed water tank assembly 3 through the second drainage pipe.

Further, the first-stage purification assembly 2-2, the second-stage purification assembly 2-3 and the third-stage purification assembly 2-4 are all of cylindrical structures, and their joints are connected through threads to facilitate disassembly in the maintenance process.

Further, according to the differences of processing capacities of the first-stage purification assembly 2-2, the second-stage purification assembly 2-3 and the third-stage purification assembly 2-4, the ratio of built-in capacities of the first-stage purification assembly 2-2, a second-stage purification assembly 2-3 and the third-stage purification assembly 2-4 is set to be 2:2:1, and under the condition that all stages of purification assemblies are completely consumed, reclaimed water with the same capacity can be processed, so that the three stages of purification assemblies can be replaced at the same time, and convenience and rapidness are achieved. In addition, excessive system outage times and overlong system outage time caused by replacing the purification assemblies in batches are avoided, and the working continuity of the system is guaranteed.

Further, the grey water treatment assembly 2 also includes a variable frequency pump 2-1, the check valve 2-5, the ultrafiltration membrane backwashing pipe 2-7 and a backwashing electromagnetic valve 2-6. The variable frequency pump 2-1 is used for pressurizing the grey water collected in the grey water storage tank 1 and then feeding the grey water into the first-stage purification assembly 2-2; the check valve 2-5 is used for preventing the reclaimed water in the pneumatic reclaimed water tank assembly 3 from being poured into the grey water treatment assembly 2; the ultrafiltration membrane backwashing pipe 2-7 is used for discharging impurities after the ultrafiltration membrane backwashing is carried out, and discharging the liquid after the backwashing to the sewage standpipe 4; and the backwashing electromagnetic valve 2-6 is used for controlling the backwashing process of the ultrafiltration membrane.

In the embodiment, the pneumatic reclaimed water tank assembly 3 includes the pneumatic water tank, a pressure gauge 3-1, a dosing tank 3-2, the metering pump 3-3, an ultraviolet sterilizer 3-5 and reclaimed water supply pipe 3-6. The pressure gauge 3-1 is connected with the pneumatic water tank, the volume of which is 100 L, and the pressure gauge 3-1 is used for monitoring the pressure in the pneumatic water tank in real time and displaying and remotely transmitting the pressure of the pneumatic water tank. The internal pressure of the pneumatic water tank is controlled to be 0.15-0.20 MPa to fulfill the subsequent flushing pressure requirement of closet pans 12 and/or urinals 13; the disinfectant is filled in the dosing tank 3-2 which is connected with the pneumatic water tank through the metering pump 3-3, and the metering pump 3-3 can add the disinfectant in the dosing tank 3-2 into the pneumatic water tank according to a certain amount; the pneumatic reclaimed water tank assembly 3 is connected with water-using facilities on the current floor through the reclaimed water supply pipe 3-6 which is used for conveying reclaimed water in the pneumatic reclaimed water tank assembly 3 to water-using points.

The pneumatic reclaimed water tank assembly 3 is provided with the ultraviolet sterilizer 3-5, which is arranged inside the pneumatic water tank or arranged at the reclaimed water outlet 11 of the pneumatic water tank. The ultraviolet sterilizer 3-5 is used for disinfecting the reclaimed water in the pneumatic water tank, and the disinfected reclaimed water is conveyed to water-using points through the reclaimed water supply pipe 3-6.

Further, the reclaimed water outlet 11 of the pneumatic reclaimed water tank assembly 3 is connected with the grey water storage tank 1 through reclaimed water circulating pipeline 3-4, and a cycling switch is arranged on the reclaimed water circulating pipeline 3-4, so that reclaimed water circulation between the pneumatic reclaimed water tank assembly 3 and the grey water storage tank 1 is realized.

Further, the dosing tank 3-2 is a plastic tank made of semitransparent UPVC material, on top of which a rotationally-opened dosing port is formed, and the disinfectant is liquid disinfectant, including 84 disinfectant or sodium hypochlorite disinfectant. The metering pump 3-3 is connected with the dosing tank 3-2, and dosing can be automatically carried out according to the water yield. The dosing amount is 1-3 mg/L according to the effective chlorine dosing amount, and the dosing point is the water inlet of the pneumatic reclaimed water tank assembly 3.

The operating principle of the indoor grey water purification and reuse device for public buildings of the embodiment is as follows:

the grey water collecting device collects high-quality miscellaneous drainage from one floor above through the grey water collecting pipeline, and collected grey water is supplied into the grey water storage tank 1 after being treated by the hair filter 1-2 arranged on the grey water feeding pipe 1-1. Under the pumping action of a sewage pump, the grey water is conveyed into the grey water treatment assembly 2 through pipeline for three-stage purification treatment after being pressurized by the sewage pump through the control valve 1-6. After three-stage purification treatment, the grey water enters the pneumatic reclaimed water tank assembly 3 for storage, and is used for flushing toilet through toilet flushing water supply pipeline. The pipeline system is closed in the whole link, and the pressure of the flushing water is regulated by the sewage pump through frequency conversion of produced water, and the treated reclaimed water is not decompressed, so that the treatment-storage-water supply function is realized through one-time pressurization, and the integral energy consumption of the system is reduced.

In the step of carrying out grey water treatment by using the grey water treatment assembly 2, the three-stage purification treatment is adopted, and the water production process is that grey water passes through the first-stage purification assembly 2-2, the second-stage purification assembly 2-3 and the third-stage purification assembly 2-4 in sequence. The water production rate is controlled by the sewage pump, and the range of the water production rate is 2 L/min-10 L/min to fill the pneumatic water tank in 10 mins at the soonest. Wherein, the first-stage purification is a coarse filtration process, and PP cotton/coarse filtration screens are adopted to filter large particles, undissolved metal oxides, broken hair and the like in the grey water; the second-stage purification is a fine filtration process, and a modified granular activate carbon column is adopted to filter small-size particles, organic pollutants, chromatic substances, heavy metal ions and the like in the grey water; the third-stage purification is an ultrafiltration process, and an internal pressure type ultrafiltration membrane component is adopted to intercept turbidity substances, macromolecular organic matters, bacteria and partial viruses, so that the sensory effect of the produced water is improved, and the quantity of microorganisms is reduced.

The reclaimed water subjected to three-stage purification treatment enters the pneumatic reclaimed water tank assembly 3 for storage. The volume of the pneumatic water tank is 100 L, the pressure of which is monitored by the pressure gauge 3-1 in real time. The metering pump 3-3 is connected with the dosing tank 3-2, and dosing is automatically carried out according to the water yield. The dosing amount is 1-3 mg/L according to the effective chlorine dosing amount, and the dosing point is the water inlet of the pneumatic reclaimed water tank assembly 3. The purified reclaimed water enters water supply pipelines of closet pans 12 and urinals 13 on the current floor.

As water continuously feeds into the grey water storage tank 1, the level of the grey water continuously rises, and when the level of the grey water reaches the overflow level, the grey water automatically overflows and is discharged into the sewage standpipe 4. With the continuous production of water in the grey water storage tank 1, when the liquid level of the grey water storage tank 1 is continuously reduced and the liquid level is reduced to the start filling water level, the automatic water supply valve 1-7 is opened, and tap water is supplied through the tap water supply pipe 1-9; when the automatic water supply valve 1-7 cannot be opened due to fault, the manual supply valve 1-8 which is parallelly set is manually opened to replenish tap water. Along with the continuous supply of tap water, the liquid level of the grey water storage tank 1 is gradually increased, and when the liquid level reaches the overflow liquid level, the automatic water supply valve 1-7 is automatically closed.

After the grey water purification and reuse device operates for a period of time, sediment generated in the grey water storage tank 1 is accumulated at the bottom of the tank under the action of gravity through the bottom slope of the grey water storage tank 1. When the sediment in the grey water storage tank 1 is accumulated, the manual evacuation valve 1-5 is opened, and the sediment is discharged into the sewage standpipe 4 under the washing of grey water.

In this embodiment, the reclaimed water after the three-stage purification can meet the following water quality requirements:

the pH value is 6.0-9.0; the chromaticity is less than or equal to 30; no unpleasant sensation on smell; turbidity (NTU) is less than or equal to 5; the total soluble solid content is less than or equal to 1500 mg/L; after 30 min of contact, the total residual chlorine is more than or equal to 1.0 mg/L, and the total residual chlorine at the tail end of the pipe network is more than or equal to 0.2 mg/L; the total number of *E. coli* is less than or equal to 3/L.

Compared with the prior art, the indoor grey water purification and reuse device for public buildings provided by the embodiment has the following advantageous effects:

(1) the grey water purification and reuse device is of a box-type structure and is vertically arranged, and the grey water storage tank, the grey water treatment assembly and the pneumatic reclaimed water tank assembly are sequentially arranged from top to bottom, so that the gravitational potential energy of water can be better utilized to reduce the operation energy consumption of the grey water purification and reuse device. The structure is compact, and the occupied space of the concentrated treatment of the miscellaneous water is greatly reduced by combining the space layout inside a large-scale public building toilet, so that the grey water purification and reuse device is more flexible and convenient to be installed, and the potential safety hazard of misconnection of water supply standpipe and reclaimed water pipe is avoided.

(2) Carry out multistage purification treatment to the reclaimed water can intercept and purify large particles, small particles and tiny microorganism in the reclaimed water to reach high standard water requirement through adding disinfectant, ultraviolet disinfection, guaranteeing the security of reclaimed water reuse.

(3) The internal pressure of the pneumatic tank is controlled to be 0.15-0.20 MPa to meet the subsequent flushing pressure requirements of closet pans and urinals. The pneumatic tank and the pressure gauge are arranged to realize variable frequency regulation of produced water, and the treated reclaimed water is not decompressed, so that the treatment-storage-supply function is realized through one-time pressurization, and the overall energy consumption of the system is reduced; the pressure gauge monitors the pressure in the pneumatic tank, and can display and remotely transmit the pressure of the pneumatic water tank, so that the intelligent control degree of the grey water purification and reuse device is increased.

(4) The reclaimed water outlet of the pneumatic reclaimed water tank assembly is connected with the grey water storage tank through the reclaimed water circulating pipeline, and the cycling switch is arranged on the reclaimed water circulating pipeline, so that the reclaimed water circulation of the pneumatic reclaimed water tank assembly and the grey water storage tank and systematic water saving are realized. Meanwhile, the condition that the reclaimed water in the pneumatic reclaimed water tank assembly is not recycled and the water quality is deteriorated to influence the safe water supply of toilet flushing is avoided.

Embodiment 3

The existing indoor drainage mode of the building is that water produced by upper-floor water consuming facilities is drained to a lower-floor ceiling along drainage pipeline by gravity and finally drained to sewage standpipe through transverse branch pipe laid at the lower-floor ceiling.

The embodiment discloses a construction method of the indoor reclaimed water reuse system for public buildings in embodiment 1, which is characterized in that an original building drainage system is modified, so that high-quality miscellaneous drainage (hands and face washing, washing and showering) from one floor above in a public building is independently collected and is reused for toilet flushing at current floor after being purified and disinfected. The construction method of the indoor reclaimed water reuse system for public buildings includes the following steps:

The drainage cross branch pipe of the high-quality miscellaneous drainage (grey water) on one floor above is connected with the grey water feeding pipe 1-1, and the grey water feeding pipe 1-1 is inserted through a reserved opening of a structural floor slab of a toilet and enters the space of the current floor; install the grey water purification and reuse device 8, and Insert the grey water feeding pipe 1-1 into a grey water feeding pipe socket of the grey water purification and reuse device 8, and seal and fix; connect the reclaimed water outlet 11 of the grey water purification and reuse device 8 with water-using facilities of the current floor through pipeline; connect the tap water supply pipe 1-9 with the grey water purification and reuse device 8; connect the overflow drain port 10 in the grey water purification and reuse device 8 with the sewage standpipe 4.

Wherein, before installing the grey water purification and reuse device 8, the actual length from the bottom of the exposed straight pipe of the grey water feeding pipe 1-1 on the toilet ceiling to the top of the grey water feeding pipe socket of the grey water purification and reuse device 8 is measured on site, and the grey water feeding pipe 1-1 with the corresponding length is selected according to the measured length. Further, the grey water feeding pipe 1-1 is made of rigid polyvinyl chloride (PVC-U).

In the construction process, the standpipe of the high-quality miscellaneous drainage at the ceiling of the current floor is cut off, and independent grey water pipeline is laid and connected, so that the high-quality miscellaneous drainage is lead into the indoor grey water purification and reuse device 8 on the current floor, and collected, treated and reused; the black water drainage pipe for the closet pans 12 and the urinals 13 on one floor above are kept unchanged and are drained according to pipe system. Since the indoor grey water purification and reuse device 8 is directly arranged in the current floor toilet, the length of the individual grey water pipe is not too long.

The water supply pipelines of the closet pans 12 and the urinals 13 on the current floor of the grey water purification and reuse device 8 are modified, and the modification mode is as follows: the tap water supply pipe is cut off, and the pneumatic reclaimed water tank assembly 3 is connected with the closet pans 12 and the urinals 13 on the current floor through pipelines, and the closet pans 12 and the urinals 13 are supplied with water only by the pneumatic reclaimed water tank assembly 3 on the current floor.

The grey water storage tank 1, the grey water treatment assembly 2 and the pneumatic reclaimed water tank assembly 3 are built and installed sequentially from top to bottom, and the independently laid grey water pipeline on one floor above is connected into the grey water purification and reuse device 8 after the grey water purification and reuse device 8 is built, and the reclaimed water outlet 11 of the water purification and reuse device 8 is connected with water-using facilities on the current floor through pipeline. The joints of the pipeline in the system are sealed and fixed by using rigid polyvinyl chloride (PVC-U) adhesive. Illustratively, the joint of the grey water feeding pipe 1-1 and the socket of the grey water feeding pipe is coated with the rigid PVC-U adhesive for sealing and fixing.

In the embodiment, the vertically building mode of the grey water storage tank 1, the grey water treatment assembly 2 and the pneumatic reclaimed water tank assembly 3 can use the gravitational potential energy of the water body better, and the operation energy consumption of the grey water purification and reuse device is reduced. The grey water purification and reuse device 8 is constructed into a box-type structure and comprises a device module and an outer decoration module, wherein the thickness of the device module is 30 cm, and the structural form is flat, having a width of 100 cm, a height of 2200 cm, and the device module can be placed at the side wall of a toilet. The outer decoration module can be adjusted by combining with actual site conditions. It is arranged from floor to ceiling, and consists of a fixed part and an openable part, and the external wall can be hung with ceramic tiles or other decoration materials and is matched with the decoration environment of a toilet.

During the construction process, the following requirements are to be met:

1. the thickness of the building construction layer of the toilet is not less than 100 mm.
2. When the sewage standpipe is arranged in the toilet, a through-floor hole of the sewage standpipe should be reserved. The size for a single standpipe hole is not less than 400 mm×450 mm, and the size for a double standpipe hole is not less than 400 mm×500 mm, and should be matched with structure design.
3. When the sewage standpipe is arranged in a pipe well, the size of the through-wall hole of the side discharge pipe is not less than 200 mm×250 mm, and should be matched with structure design.
4. When a modular indoor reclaimed water system in an existing public building toilet is modified, the space and the position are reserved by combining with a floor plan layout.
5. The sewage standpipe and the closet pans 12 are arranged at the same side, and the distance between the center of the sewage standpipe and the center of the closet pans 12 is not more than 1000 mm.

Compared with the prior art, the construction method of the indoor reclaimed water reuse system for public buildings has the following advantageous effects:

(1) through setting up split-level drainage system, the high-quality miscellaneous drainage from one floor above is collected by combining the spatial layout in the toilet of the large public building for toilet (closet pans and/or urinals) on the current floor to use after purification and disinfection, so that to realize the target of distributed split-level drainage, and solve the problem that it's difficult to collect life miscellaneous water in public buildings.

(2) The grey water purification and reuse device is integrally built into a box-type structure and is vertically arranged, and the grey water storage tank, the grey water treatment assembly and the pneumatic reclaimed water tank assembly are sequentially arranged from top to bottom, so that the gravitational potential energy of water can be better utilized to reduce the operation energy consumption of the grey water purification and reuse device. The structure is compact, and the occupied space of the concentrated treatment of the miscellaneous water is greatly reduced by combining the internal space layout inside a large-scale public building toilet, so that the grey water purification and reuse device is more flexible and convenient to install, and the potential safety hazard of misconnection of water supply standpipe and reclaimed water pipe is avoided.

Embodiment 4

In another specific embodiment of the present application, a reclaimed water reuse control system for controlling the operation of the indoor reclaimed water reuse system for public buildings in embodiment 1 is disclosed, that is, an indoor reclaimed water reuse control system for public buildings is disclosed, which includes a raw water tank liquid level control assembly, a tap water supply control assembly, a reclaimed water circulation purification control assembly, a disinfection control assembly, and a display and alarm assembly.

The raw water tank liquid level control assembly, which is used for controlling the liquid level height in the grey water storage tank 1, includes a water level controller and the liquid level sensor 1-10, wherein the liquid level sensor 1-10 is used for sensing the alarm liquid level, the low liquid level, the high liquid level and the overflow liquid level in the grey water storage tank 1. The alarm liquid level, the low liquid level, the high liquid level and the overflow liquid level are arranged in sequence from low to high, wherein the low liquid level is the start filling water level 1-12, and the high liquid level is a stop filling water level 1-11. The liquid level sensor 1-10 can transmit the liquid level information monitored in real time to the water level controller, and the water level controller controls the tap water supply control assembly according to the received liquid level information so as to control the liquid level height in the grey water storage tank 1. In addition, the water level controller can also transmit water level information and alarm information to the display and alarm assembly and display the water level information and the alarm information on the display screen of the display and alarm assembly.

The tap water supply control assembly includes a water supply controller, the automatic water supply valve 1-7 and the manual water supply valve 1-8, wherein the water supply controller is used for controlling the opening and closing of the automatic water supply valve 1-7. When the liquid level sensor 1-10 monitors that the liquid level reaches the low liquid level, the water supply controller controls the automatic water supply valve 1-7 to be opened, and when the liquid level sensor 1-10 monitors that the liquid level reaches the high liquid level, the water supply controller controls the automatic water supply valve 1-7 to be closed. When the liquid level sensor 1-10 monitors that the liquid level in the grey water storage tank 1 reaches the alarm liquid level, the liquid level sensor 1-10 transmits alarm liquid level information to a liquid level controller, and the liquid level controller displays the alarm liquid level information on the display screen of the system to remind the automatic water supply valve 1-7 to be automatically opened or the manual water supply valve 1-8 to be manually opened; when the liquid level sensor 1-10 monitors that the liquid level in the grey water storage tank 1 reaches the low liquid level, the liquid level sensor 1-10 transmits low liquid level information to the liquid level controller, and the liquid level controller starts the automatic water supply valve 1-7 of tap water by controlling the water supply controller of the tap water supply control assembly to replenish tap water so as to gradually raise the liquid level; when the liquid level sensor 1-10 monitors that the liquid level in the grey water storage tank 1 rises to the high liquid level, the liquid level sensor 1-10 transmits high liquid level information to the liquid level controller, and the liquid level controller closes the automatic water supply valve 1-7 of tap water by controlling the water supply controller of the tap water supply control assembly to stop the tap water replenishing; when the liquid level sensor 1-10 detects that the liquid level reaches the overflow liquid level, the raw water in the grey water storage tank 1 automatically overflows and flows into the sewage standpipe 4 through the overflow pipe 1-3.

The reclaimed water circulation purification control assembly is used for starting up circulation purification and periodic circulation purification of reclaimed water in the reclaimed water pneumatic tank assembly 3. The reclaimed water circulation purification control assembly includes a circulation purification controller, the cycling switch 3-7 and a cycling device, wherein the cycling device is a circulating pump, and the cycling switch 3-7 is arranged on the reclaimed water circulating pipeline 3-4. The circulation purification controller controls the circulating pump to discharge water to be circularly purified in the pneumatic water tank into the grey water storage tank 1 along the circulating pipeline 3-4 by controlling the cycling switch 3-7, and the circulation purification treatment is carried out along with the new round of water production process.

The starting up circulation purification is a method that starts up the cycling device when connecting with power supply to perform circulation purification filtration on all stored water in the pneumatic water tank, wherein the purification time is determined by calculation according to the maximum stored water volume and the water production rate of the pneumatic water tank, and the total starting up purification time is not more than 2 minutes. And the periodic circulation purification is a method that carries out circulation purification filtration on all stored water in the pneumatic water tank when the stored water in the pneumatic water tank is not used for more than 12 hours.

The disinfection control assembly includes a disinfection controller which quantitatively adds disinfectant by controlling the metering pump 3-3 according to the water yield of the variable frequency pump 2-1. The disinfectant is liquid disinfectant, including 84 disinfectant or sodium hypochlorite disinfectant.

The display and alarm assembly is used for carrying out screen display and alarm according to information input by the raw water tank liquid level control assembly, the tap water supply control assembly, the reclaimed water circulation purification control assembly and the disinfection control assembly. The display and alarm assembly includes the display screen and an alarm, wherein the display screen is used for displaying liquid level, disinfectant and filtering volume of the purification assembly, and the alarm is used for giving alarm on water shortage of the grey water storage tank, insufficient disinfectant and maintenance of consumable materials of the purification assembly. Wherein, the triggering mode of water shortage in the grey water storage tank is as follows: alarming when the liquid level reaches the alarm liquid level and alarming when the dosage in the disinfectant container is insufficient; the triggering mode of maintenance of consumable materials of the purification assembly is as follows: the water yield is measured according to the filtering volume of the purifying assembly, and when the maximum filtering capacity of the purifying assembly is reached, the alarm sends out maintenance of consumable materials alarm. The alarm mode of the alarm includes sound and color alarm, wherein the sound alarm is a sound alarm with sound of not less than 80 decibels, and the color alarm is that the background color of the display screen is displayed in red. After the fault alarm is processed, the fault alarm can be eliminated through screen operation.

Figure 4:
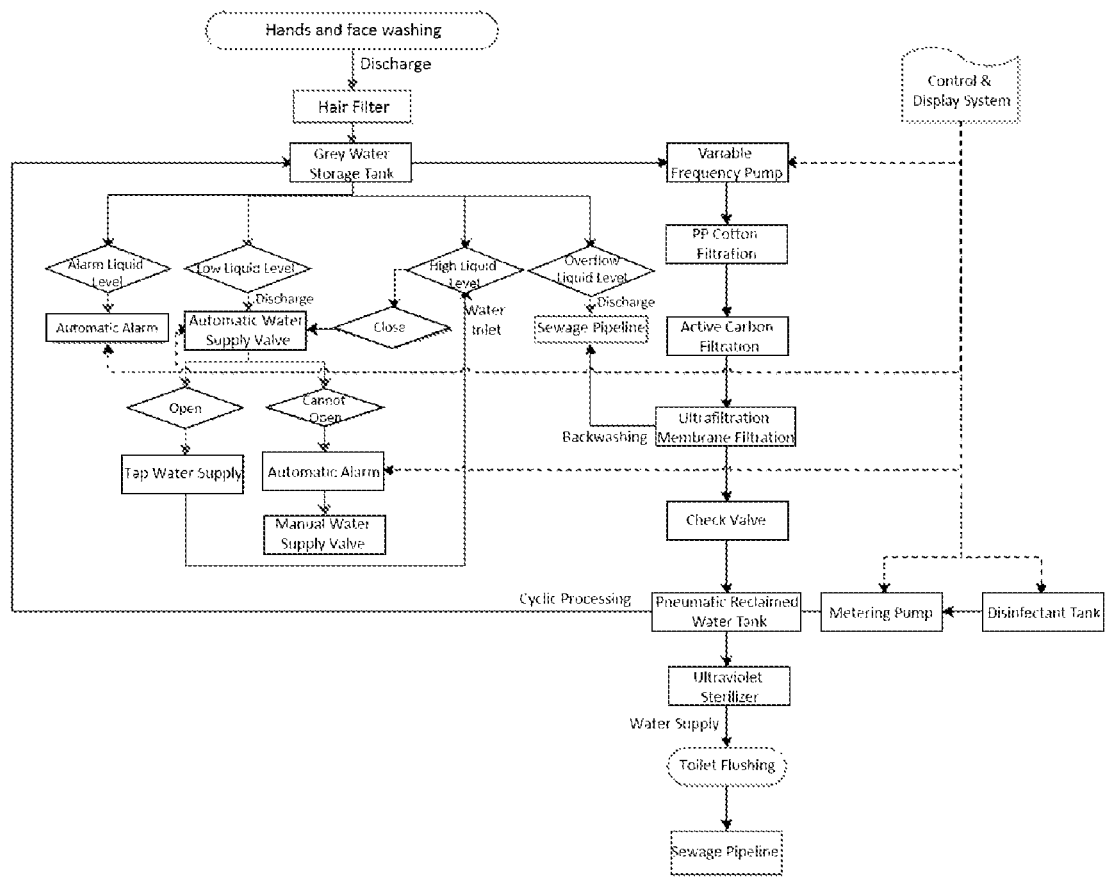
FIG. 4 is a control flow chart of an indoor reclaimed water reuse method in public buildings in the embodiment of the present application.

The control process of the reclaimed water reuse control system for public buildings in the embodiment 1 by using the reclaimed water reuse control system in the embodiment is shown in FIG. 4. The indoor reclaimed water reuse control method for public buildings includes the following control processes:

utilizing the raw water tank liquid level control assembly, the tap water supply control assembly and the reclaimed water circulation purification control assembly to control water production;

utilizing the disinfection control assembly to control disinfection on the produced reclaimed water;

utilizing the display and alarm assembly to display working state and control alarm.

Further, the specific process of utilizing the raw water tank liquid level control assembly, the tap water supply control assembly and the reclaimed water circulation purification control assembly to control water production is as follows:

after the reclaimed water reuse control system is started, the cycling device of the reclaimed water circulation purification control assembly is started to discharge all reclaimed water stored in the pneumatic water tank into the grey water storage tank 1 through the reclaimed water circulating pipeline 3-4. Simultaneously/later, grey water generated in one floor above enters the grey water storage tank 1 through the grey water collecting pipeline and the grey water feeding pipe 1-1 sequentially. Reclaimed water (including reclaimed water purified by starting up circulation purification and grey water generated in one floor above) entering the grey water storage tank 1 is subjected to three-stage purification through the grey water treatment assembly 2 and then enters the pneumatic water tank; the reclaimed water entering the pneumatic water tank is pressurized and then supplied to reclaimed water reuse facilities on the current floor.

When the liquid level sensor 1-10 monitors that the liquid level in the grey water storage tank 1 reaches the alarm liquid level, the liquid level sensor 1-10 transmits alarm liquid level information to the liquid level controller, and the liquid level controller displays the alarm liquid level information on the display screen of the system to remind the automatic water supply valve 1-7 to be automatically opened or the manual water supply valve 1-8 to be manually opened; when the liquid level sensor 1-10 monitors that the liquid level in the grey water storage tank 1 is lower than the overflow liquid level, the liquid level sensor 1-10 transmits low liquid level information to the liquid level controller which does not act, and the grey water storage tank 1 continuously collects grey water from one floor above. The collected grey water enters the grey water treatment assembly 2 for three-stage purification treatment, and continuously produced water enters the pneumatic water tank; when the liquid level sensor 1-10 monitors that the liquid level in the grey water storage tank 1 reaches the low liquid level, the liquid level sensor 1-10 transmits low liquid level information to the liquid level controller, and the liquid level controller starts the automatic water supply valve 1-7 of tap water by controlling the water supply controller of the tap water supply control assembly, or the manual water supply valve 1-8 is manually controlled, to replenish tap water so as to gradually raise the liquid level; when the liquid level sensor 1-10 monitors that the liquid level in the grey water storage tank 1 rises to the high liquid level, the liquid level sensor 1-10 transmits high liquid level information to the liquid level controller, and the liquid level controller closes the automatic water supply valve 1-7 of tap water by controlling the water supply controller of the tap water supply control assembly, or the manual water supply valve 1-8 is manually closed, to stop the tap water replenishing; when the liquid level sensor 1-10 detects that the liquid level reaches the overflow liquid level, the raw water in the grey water storage tank 1 automatically overflows and flows into the sewage standpipe 4 through the overflow pipe 1-3.

In the embodiment, when the reclaimed water in the pneumatic water tank is stored for more than 12 hours without being supplied, the cycling switch 3-7 of the reclaimed water circulation purification control assembly is started to discharge all the reclaimed water stored in the pneumatic water tank into the grey water storage tank 1 through the reclaimed water circulating pipeline 3-4 for circulating and purifying treatment, and the reclaimed water subjected to the circulating and purifying treatment enters the pneumatic water tank again.

Further, the specific process of utilizing the disinfection control assembly to carry out disinfection control on the produced reclaimed water is as follows:

the disinfection controller of the disinfection control assembly quantitatively feeds the disinfectant in the dosing tank 3-2 into the pneumatic water tank for disinfection by controlling the metering pump 3-3 according to the water yield of the variable frequency pump 2-1, and controls the metering pump 3-3 to start working when the variable frequency pump 2-1 works, and feeds different amount disinfectants according to the power of the variable frequency pump. When the variable frequency pump 2-1 is suspended, the disinfectant is not added into the pneumatic water tank any more.

Further, the specific process of utilizing the display and alarm assembly to display the working state and control the alarm is as follows:

the display and alarm assembly displays the working state information on the display screen according to the information transmitted by the raw water tank liquid level control assembly, the tap water supply control assembly, the reclaimed water circulation purification control assembly and the disinfection control assembly, and the alarm gives alarm on water shortage of the grey water storage tank, insufficient disinfectant and maintenance of consumable materials of the purification assembly according to the working state information, and the alarm mode adopts screen red background display and/or sound alarm.

The working state information includes liquid level state information, disinfectant remaining amount information and information of the volume of the purified assembly which is filtered. The triggering mode of water shortage alarm of the grey water storage tank is as follows: alarming when the liquid level reaches the alarm liquid level; the triggering mode of insufficient dosage alarm is as follows: giving alarm when the metering data of the metering pump 3-3 shows that the dosage of the disinfectant in the dosing tank 3-2 is insufficient; the triggering mode of maintenance of consumable materials of the purification assembly is as follows: measuring the workload of the variable frequency pump according to the filtering volume of the purifying assembly, and when the control valve 1-6 monitors that the water yield reaches the maximum filtering capacity of the purifying assembly, the alarm gives maintenance of consumable materials alarming.

Illustratively, when the liquid level sensor 1-10 monitors that the liquid level in the grey water storage tank 1 reaches alarm liquid level, the alarm gives the water shortage alarm; when the metering data of the metering pump 3-3 shows that the disinfectant dose in the dosing tank 3-2 is insufficient, the alarm gives the insufficient dose alarm; when the control valve 1-6 monitors that the water yield reaches the maximum filtration capacity of the purification assembly, the alarm sends out the maintenance of consumable materials alarm. For example, the liquid level sensor 1-10 senses the real-time liquid level change value in the grey water collecting tank, and when the liquid level value is reduced to the set alarm liquid level, the liquid level sensor sends signal to the control system. And the alarm is displayed in the form of an alarm state in the display screen, and when the liquid level value is increased, the alarm reminding signal is turned off.

Compared with the prior art, the indoor reclaimed water reuse control system for public buildings provided by the embodiment controls the liquid level height in the grey water storage tank through the automatic liquid level control assembly of the raw water tank; the liquid level height in the grey water storage tank is controlled through the tap water supply control assembly, so that the stable and safe working level of the reclaimed water in the grey water storage tank is ensured; the starting up circulation purification and the periodic circulation purification of the reclaimed water in the pneumatic reclaimed water tank assembly are controlled by the reclaimed water circulation purification control assembly, so that the communication between the pneumatic reclaimed water tank and the grey water storage tank is realized to establish a reclaimed water circulation line, and the problem that the quality of the reclaimed water in the pneumatic reclaimed water tank assembly is deteriorated to influence the safe water supply of toilet flushing because the reclaimed water is not recycled for a long time is avoided; the disinfection control assembly controls the metering pump to quantitatively feed disinfectant, and the disinfectant is fed in equal proportion by combining the water yield, so that the disinfection of reclaimed water is realized; the information input by the display and alarm assembly is used for screen display and timely alarming for the raw water tank liquid level control assembly, the tap water supply control assembly, the reclaimed water circulation purification control assembly and the disinfection control assembly. The intelligent control level of the indoor reclaimed water reuse control system for public buildings is high, and smooth proceeding of various links of 'water inlet-water storage-disinfection-water supply' is realized through various intelligent management and control modes to guarantee the realization of reclaimed water treatment targets, reduce the equipment failure rate, and greatly improve the reliability and the stability of system operation.

The above is only preferred embodiments of the present application, but the scope of the present application is not limited thereto, and any modification or substitution that can be easily conceived by those skilled in the art within the spirit and principle of the present disclosure shall be included in the protection scope of the present disclosure.

What is claimed is:

1. An indoor grey water purification and reuse system for multistory public buildings, comprising:
    a grey water collecting system including fluid conduits fluidically connected to at least one source of grey water for collecting and flowing collected grey water from an upper floor to a floor sequentially below;
    a grey water storage tank (1) located on the floor sequentially below, having an inlet for receiving grey water from a discharge end of the fluid conduits of the grey water collecting system on the upper floor by gravity, and an outlet permitting egress of collected grey water;
    a grey water treatment assembly (2) on a lower floor, sequentially below the grey water storage tank, in fluid communication with the outlet of the grey water storage tank (1), and including at least two purification treatment stages capable of purifying grey water to produce reclaimed water; and
    a pressurizable, pneumatic reclaimed water tank assembly (3) for receiving the reclaimed water, including means for disinfecting the reclaimed water, and being capable of supplying the reclaimed water to water to water reuse facilities which are located on the same floor that the pressurizable, pneumatic reclaimed water tank assembly (3) is located, at constant pressure.

2. The indoor grey water purification and reuse system of claim 1 further comprising:
    a hair filter (1-2) upstream of the grey water storage tank (1) inlet, which is capable pre-filtering the collected grey water to prevent hair from entering the grey water storage tank (1).

3. The indoor grey water purification and reuse system of claim 1 further comprising:
    an overflow drain port (10) at an upper part of the grey water storage tank (1), is fluidically connected with a sewage standpipe (4) through an overflow pipe (1-3); and
    a drain outlet at the bottom of the grey water storage tank (1), is fluidically connected with the sewage standpipe (4) through an evacuation pipe (1-4).

4. The indoor grey water purification and reuse system of claim 3, wherein the evacuation pipe (1-4) is provided with a manual evacuation valve (1-5) for controlling discharge of sediment in the grey water storage tank (1) through the evacuation pipe (1-4).

5. The indoor grey water purification and reuse system of claim 4, wherein the grey water storage tank (1) is fluidically connected with a water supply standpipe (15) through a tap water supply pipe (1-9) which is provided with at least one of an automatic water supply valve and a manual water supply valve.

6. The indoor grey water purification and reuse system of claim 5, wherein the water outlet of the grey water storage tank (1) is fluidically connected with a water inlet of the grey water treatment assembly (2) through a first drainage pipe; the first drainage pipe is provided with a control valve (1-6) for controlling flow through the first drainage pipe of the grey water storage tank (1), and is fluidically connected with the grey water treatment assembly (2) and capable of metering the quantity of collected grey water fed into the grey water treatment assembly (2).

7. The indoor grey water purification and reuse system of claim 6, wherein the grey water treatment assembly (2) is fluidically connected with the pressurizable, pneumatic reclaimed water tank assembly (3) through a second drainage pipe; and a check valve (2-5) is arranged on the second drainage pipe for preventing reclaimed water in the pressurizable, pneumatic reclaimed water tank assembly (3) from flowing into the grey water treatment assembly (2).

8. The indoor grey water purification and reuse system of claim 1, wherein a bottom surface of the grey water storage tank (1) is sloped, and the evacuation pipe (1-4) is arranged along the slope of the sloped surface.

9. The indoor grey water purification and reuse system of claim 1 at least two purification treatment stages comprise a first-stage purification assembly (2-2), a second-stage purification assembly (2-3); and further comprising a third-stage purification assembly (2-4), all fluidically connected in sequence.

10. The indoor grey water purification and reuse system of claim 9, wherein:

the first-stage purification assembly (2-2) includes a coarse filter screen for filtering large particles, non-dissolved metal oxides and broken hairs in the grey water;

the second-stage purification assembly (2-3) includes a modified granular activated carbon column for filtering smaller particles, organic pollutants, chromatic substances and heavy metal ions in the grey water; and the third-stage purification assembly (2-4) includes an internal pressure ultrafiltration membrane capable of intercepting turbidity causing substances, macromolecular organic matters, bacteria and partial viruses.

11. The indoor grey water purification and reuse system of 9, wherein the first-stage purification assembly (2-2), the second-stage purification assembly (2-3) and the third-stage purification assembly (2-4) are all cylindrically shaped structures that are fluidically connected by piping with threaded connections.

* * * * *